United States Patent
Nackel et al.

(10) Patent No.: US 11,692,793 B2
(45) Date of Patent: Jul. 4, 2023

(54) OPTICAL BENCH

(71) Applicant: Wilcox Industries Corp., Newington, NH (US)

(72) Inventors: Michael C. Nackel, Manchester, NH (US); James W. Teetzel, Portsmouth, NH (US)

(73) Assignee: Wilcox Industries Corp., Newington, NH (US)

( * ) Notice: Subject to any disclaimer, the term of this patent is extended or adjusted under 35 U.S.C. 154(b) by 807 days.

(21) Appl. No.: 16/596,920

(22) Filed: Oct. 9, 2019

(65) Prior Publication Data

US 2021/0172704 A1  Jun. 10, 2021

Related U.S. Application Data

(60) Provisional application No. 62/743,737, filed on Oct. 10, 2018.

(51) Int. Cl.
*F41G 1/30* (2006.01)
*F41G 1/36* (2006.01)

(52) U.S. Cl.
CPC ................. *F41G 1/30* (2013.01); *F41G 1/36* (2013.01)

(58) Field of Classification Search
CPC .. F41G 1/30; F41G 1/36; G02B 23/14; G02B 23/10; G02B 23/16
See application file for complete search history.

(56) References Cited

U.S. PATENT DOCUMENTS

| 5,355,608 A * | 10/1994 | Teetzel .................... F42B 3/113 42/117 |
| 6,631,040 B1 | 10/2003 | Cox |
| 2006/0098307 A1* | 5/2006 | Campean ............... G02B 23/16 359/819 |
| 2009/0193705 A1* | 8/2009 | LoRocco .................. F41G 1/30 42/123 |
| 2011/0232152 A1* | 9/2011 | Thomas ................. G02B 23/16 29/428 |

(Continued)

FOREIGN PATENT DOCUMENTS

| DE | 102016004742 A1 | 10/2017 |
| WO | 2017123914 A1 | 7/2017 |

OTHER PUBLICATIONS

European Search Report received in EP19202443.8 dated Feb. 6, 2020.

*Primary Examiner* — Joshua E Freeman
(74) *Attorney, Agent, or Firm* — McLane Middleton, Professional Association

(57) ABSTRACT

An optical bench for supporting a reflex sight in a weapon-mounted sight assembly includes a reflex sight mounting portion having a first surface for receiving a reticle light source and a first reticle lens mounting arm spaced apart from a second reticle lens mounting arm. The first and second reticle lens mounting arms are attached to the reflex sight mounting portion and the first and second reticle lens mounting arms are configured to engage opposite sides of a reticle lens to support the reticle lens in an optical path of the reticle light source. The first and second reticle lens mounting arms are sufficiently resilient to accommodate thermal expansion and contraction of the reticle lens. In further aspects, a weapon sight assembly employing an optical bench and a method for manufacturing an optical bench are provided.

22 Claims, 21 Drawing Sheets

(56) References Cited

U.S. PATENT DOCUMENTS

| | | | |
|---|---|---|---|
| 2012/0047788 A1* | 3/2012 | Capson | F41G 1/467 |
| | | | 42/130 |
| 2015/0198415 A1* | 7/2015 | Campean | F41G 1/30 |
| | | | 42/137 |
| 2015/0267997 A1* | 9/2015 | Collin | H01S 5/183 |
| | | | 359/1 |
| 2016/0102943 A1* | 4/2016 | Teetzel | F41G 1/35 |
| | | | 42/113 |
| 2016/0313089 A1* | 10/2016 | Collin | F41G 1/30 |
| 2016/0327371 A1* | 11/2016 | Teetzel | F41C 23/16 |
| 2016/0377378 A1* | 12/2016 | Collin | G02B 23/10 |
| | | | 42/113 |
| 2017/0031126 A1 | 2/2017 | Erbe et al. | |
| 2017/0205194 A1* | 7/2017 | Teetzel | F41G 1/26 |
| 2017/0205202 A1* | 7/2017 | Teetzel | F41C 27/00 |
| 2018/0156573 A1* | 6/2018 | Capson | F41G 1/30 |
| 2019/0170998 A1* | 6/2019 | Öttl | G02B 23/14 |
| 2019/0360777 A1* | 11/2019 | Grace | F41G 1/345 |
| 2020/0025518 A1* | 1/2020 | Nackel | F41G 1/30 |
| 2020/0240748 A1* | 7/2020 | Connolly | F41G 1/30 |

\* cited by examiner

OPTICAL BENCH

CROSS REFERENCE TO RELATED APPLICATION

This application claims the priority benefit of U.S. provisional application No. 62/743,737, filed Oct. 10, 2018. The aforementioned application is incorporated herein by reference in its entirety.

BACKGROUND

The present disclosure relates generally to the field of weapon sights and, in particular, to an optical bench for a laser sight and opto-mechanical assemblies and laser sights employing the same.

Reflex sights are generally known in the art and typically include a battery-powered light source such as an LED or laser for projecting an illuminated reticle image, such as a colored (e.g., red or green) dot. Such reflex sights include a lens assembly (typically non-magnifying), e.g., employing a beam splitter, dichroic mirror, or similar reflective coating or film that reflects light from the light source along the viewing axis of the lens so that the viewer sees both the target field of view and the projected reticle image superimposed thereon to aid the user in aiming the barrel of a firearm or other weapon. Laser sights are also known and comprise one or more laser devices configured to emit a laser beam onto a target for the purpose of aiding the user in aiming the barrel of a firearm or other weapon.

In each case, the alignment of the sight must be adjusted with respect to the barrel of the weapon (bore sighted) so that the position of the emitted light (i.e., the reticle image on the lens in the case of a reflex sight or the position of the laser beam on the target in the case of a laser sight) corresponds with or intersects the trajectory path of the fired projectile at the target. Adjusting the alignment of the sight typically involves adjusting the horizontal alignment (windage) and vertical alignment (elevation) using threaded adjustment screws, and can be a time consuming process. In the case of multiple sights, the horizontal and vertical alignment must be performed for each sight. In addition, even when a sight has been bore sighted for a particular weapon it may be necessary to re-bore sight for different conditions, including changes in distance to target (for example, long range vs. short range or close combat conditions), differences in muzzle velocity or projectile speed for different types of ammunition rounds, and changes in incline (e.g., level shooting vs. elevated or depressed firing position relative to target), and so forth.

Reflex sights typically use a glass lens mounted in a frame. Because plastic lens materials have a higher coefficient of thermal expansion than glass, plastic lenses have not been widely adapted for use in reflex sights. Because plastic lenses are less expensive than glass lenses, it would be desirable to provide a lens mount which could accommodate the increased thermal expansion associated with a plastic lens, thereby lowering manufacturing costs of the sight.

SUMMARY

In one aspect, the present disclosure contemplates a new and improved sight apparatus including an optical bench structure configured to support optical assemblies and electronic and electrical components.

In another aspect, the optical bench structure is monolithic, formed via an additive manufacturing processes.

In another aspect, the optical bench structure includes one or more flexures for adjustment of elevation and windage of associated optical elements.

In another aspect, the optical bench structure includes one or more flexures for adjustment of the pointing vector of laser sight assemblies.

In another aspect, the optical bench structure includes one or more flexures configured for optothermal stability of optical assemblies.

In another aspect, the reflex sight apparatus includes a plastic, e.g., acrylic reflex lens. In a further aspect, the plastic reflex lens includes an embedded iron (mechanical) sight.

In another aspect, a weapon sight assembly includes an optical bench, the optical bench being a single-piece structure having no bonded or bolted joints, a reflex sight portion disposed on the optical bench, wherein the reflex sight portion includes a reticle receiving portion, and a lens assembly disposed on the optical bench, wherein the lens assembly includes a reflex lens.

In another aspect, a weapon sight assembly includes an optical bench having one or more reflex lens mounting arms, wherein each of the one or more reflex lens mounting arms are configured to retain the reflex lens.

In another aspect, a weapon sight assembly includes a reticle sight portion having a light source and a reticle frame, and wherein the reticle light source assembly is configured to be received by the reticle receiving portion.

In another aspect, a weapon sight assembly includes a reflex lens configured to function as a partially reflective mirror.

In another aspect, a weapon sight assembly includes one or more threaded adjustment screws for adjusting elevation and/or windage of the reflex sight portion.

In another aspect, a weapon sight assembly includes a rear sight mounting portion and an iron sight system having a front sight embedded in the reflex lens, and a rear sight, wherein the rear sight is attached to the rear sight mounting portion.

In another aspect, a weapon sight assembly includes one or more reflex lens mounting arms having a horizontal arm portion and two upstanding arm portions, wherein the two upstanding arm portions are configured to claim a side portion of the reflex lens.

In another aspect, a weapon sight assembly includes an optical bench, the optical bench being a single-piece structure having no bonded or bolted joints, a laser receptacle portion disposed on the optical bench, the laser receptacle portion having one or more receptacles and one or more aiming laser assemblies, and a bore sight adjustment lever disposed on the optical bench, the bore sight adjustment lever extending from the laser receptacle portion.

In another aspect, a weapon sight assembly includes one or more receptacles configured to support one or more laser emitter.

In another aspect, a weapon sight assembly includes one or more laser emitters. In a further aspect, the one or more laser emitters are a visible target point laser, a visible target aiming laser, an infrared target pointing laser, an infrared target aiming laser, an infrared illuminator laser, and/or an infrared flood light laser.

In another aspect, a weapon sight assembly includes one or more receptacles configured to substantially align with one or more laser diode receptacles.

In another aspect, a weapon sight assembly includes one or more aiming laser assemblies which are a laser emitter and/or a laser lens assembly.

In another aspect, a weapon sight assembly includes one or more lens assemblies having a laser focusing lens and a lens holder, wherein the lens holder comprises a laser focusing lens and a lens holder.

In another aspect, a weapon sight assembly includes one or more flexures for directional adjustment of the one or more aiming laser assemblies, a platform portion disposed on the optical bench, wherein the platform portion has one or more threaded openings, and one or more threaded screws, wherein the one or more threaded screws are configured to rotatably engage with the one or more threaded openings.

In another aspect, a weapon sight assembly includes a bench surface, wherein the one or more threaded screws are configured to rotatably engage with the bench surface to adjust the orientation of the bench surface with respect to the platform portion.

In another aspect, the bore sight adjustment lever includes a windage adjustment bearing surface disposed on the bore sight adjustment lever, the windage adjustment bearing surface configured to engage with a windage adjustment assembly and a windage counter spring bearing surface disposed on the bore sight adjustment lever, the windage counter spring bearing surface configured to engage with a windage adjustment counter spring. The bore sight adjustment lever further includes an elevation adjustment bearing surface disposed on the bore sight adjustment lever, the elevation adjustment bearing surface configured to engage with an elevation adjustment assembly and an elevation counter spring bearing surface disposed on the bore sight adjustment lever, the elevation counter spring bearing surface configured to engage with an elevation counter spring.

In another aspect, a weapon sight assembly includes a windage adjustment assembly including a first sleeve having an internal helical thread, a rotatable barrel having an external helical thread complimentary to the internal helical thread, and a bearing member.

In another aspect, a weapon sight assembly includes an elevation adjustment assembly including a sleeve having an internal helical thread, a rotatable barrel having an external helical thread complimentary to the internal helical thread, and a bearing member.

In another aspect, a weapon sight assembly includes an optical bench, the optical bench being a single-piece structure having no bonded or bolted joints, a reflex sight portion disposed on the optical bench, wherein the reflex sight portion includes a reticle receiving portion, a lens assembly disposed on the optical bench, wherein the lens assembly includes a reflex lens, a laser receptacle portion disposed on the optical bench, the laser receptacle portion comprising one or more receptacles and one or more aiming laser assemblies, a bore sight adjustment lever disposed on the optical bench, the bore sight adjustment lever extending from the laser receptacle portion, and a mounting member, wherein the mounting member is connected to the optical bench by one or more flexures.

In another aspect, a monolithic structure for adjusting and maintaining coalignment of lasers is provided.

In another aspect, a method for adjusting and maintaining coalignment of lasers is provided.

In another aspect, a method and apparatus for mounting and athermalization of a plastic lens for high shock environments is provided.

In another aspect, a method of manufacturing an optical bench having a single-piece structure is provided.

In another aspect, a method of additively manufacturing an optical bench into a single-piece structure having no bonded or bolted joints is provided. Additively manufacturing the optical bench may include:

a. additively manufacturing a reflex sight assembly mounting portion;

b. additively manufacturing a reflex lens mounting arms;

c. additively manufacturing a pivot flexure between the reflex sight assembly mounting portion and the reflex lens mounting arms;

d. additively manufacturing a pointing laser receptacle portion;

e. additively manufacturing a pivot flexure between the pointing laser receptacle portion and the reflex sight assembly mounting portion;

f. additively manufacturing a mounting portion;

g. additively manufacturing a windage and elevation adjustment lever; and h. additively manufacturing a pivot flexure between the mounting portion and the windage and elevation adjustment lever.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

Figure 1:
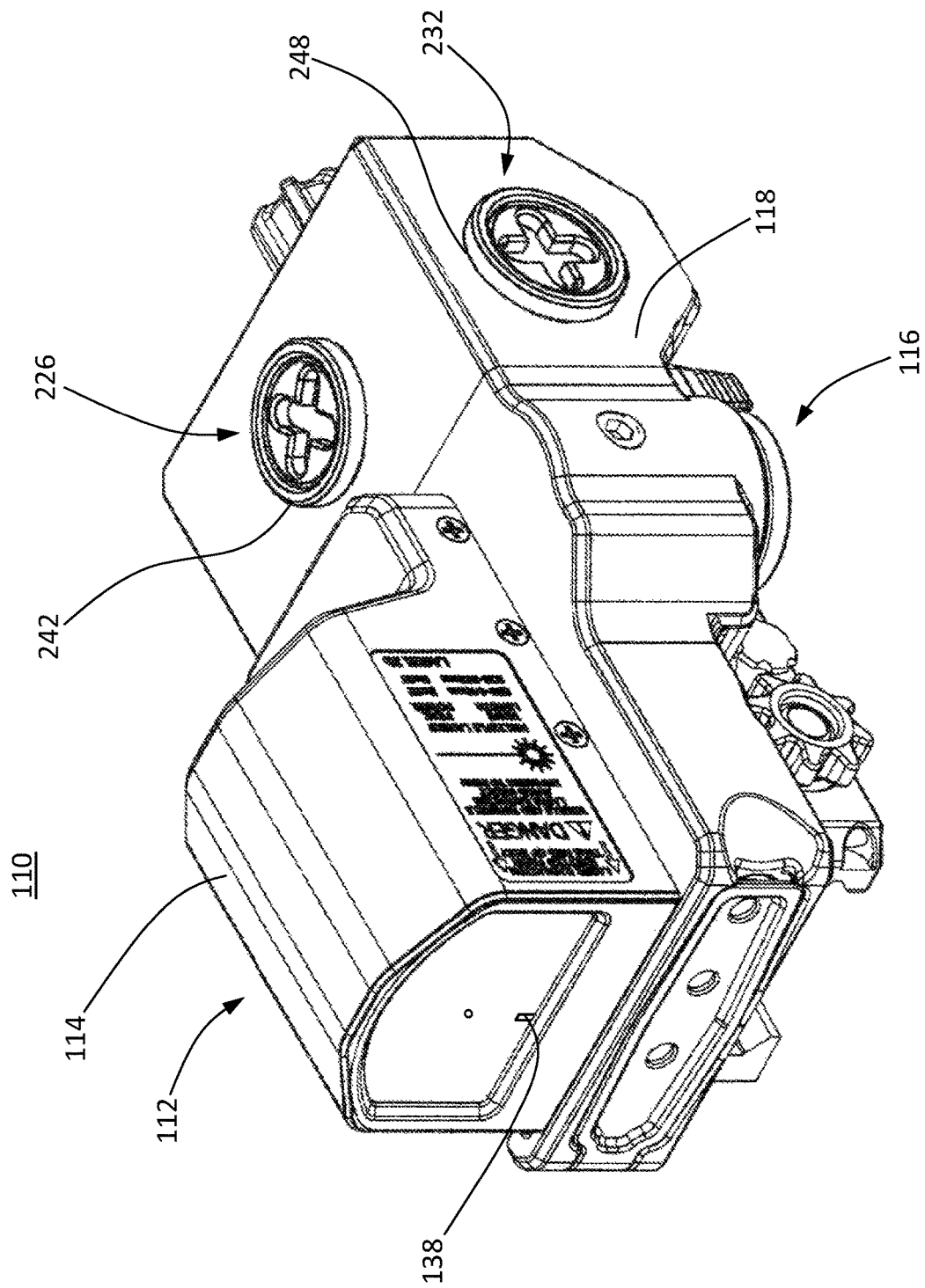
FIG. 1 is an isometric view of an exemplary sight embodying the present invention.
Figure 2:
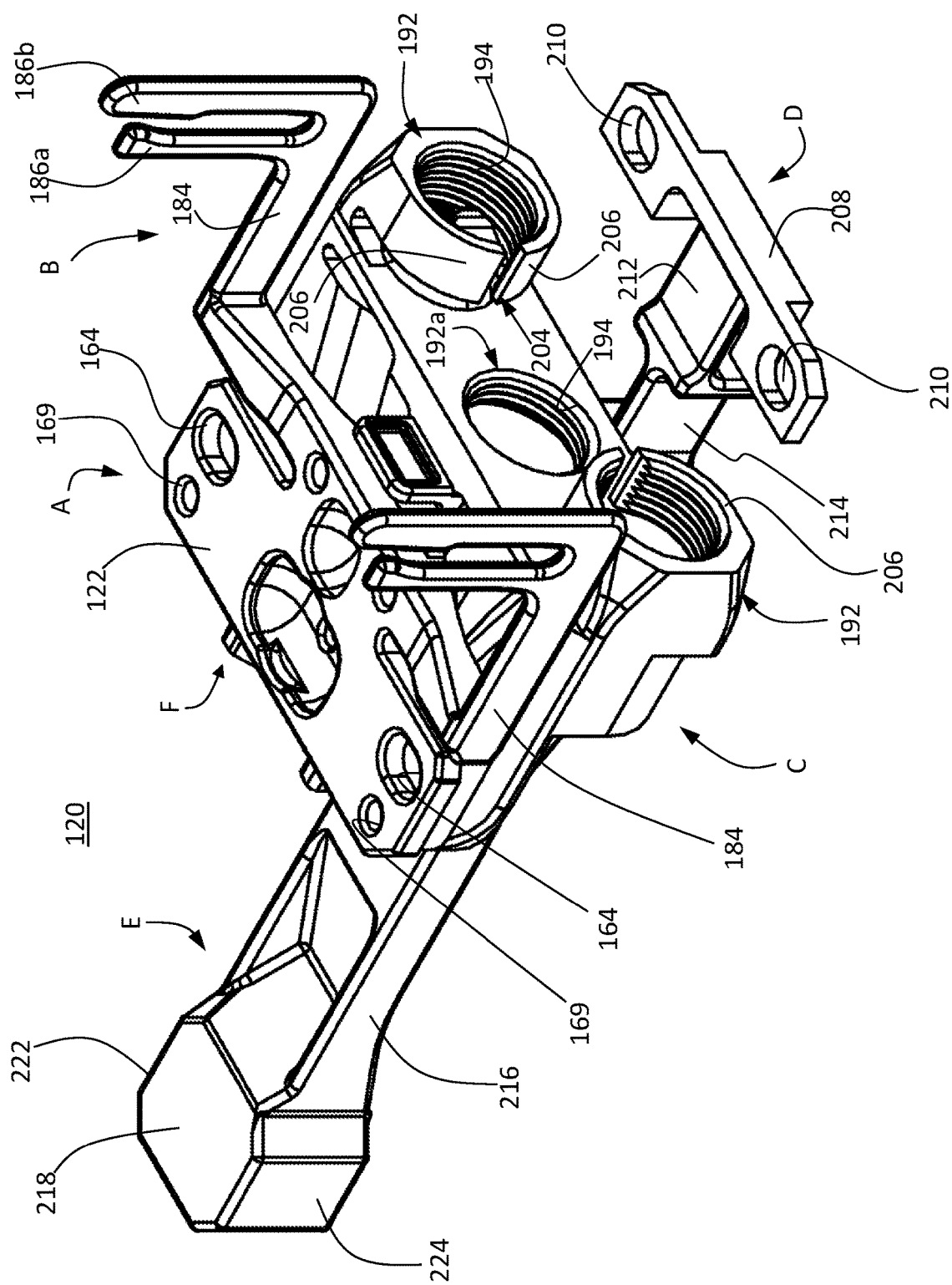
FIG. 2 is an isometric view of an exemplary optical bench for a combined reflex and laser aiming sight in accordance with an exemplary embodiment of the invention, taken generally from above, the front, and the left side.
Figure 3:
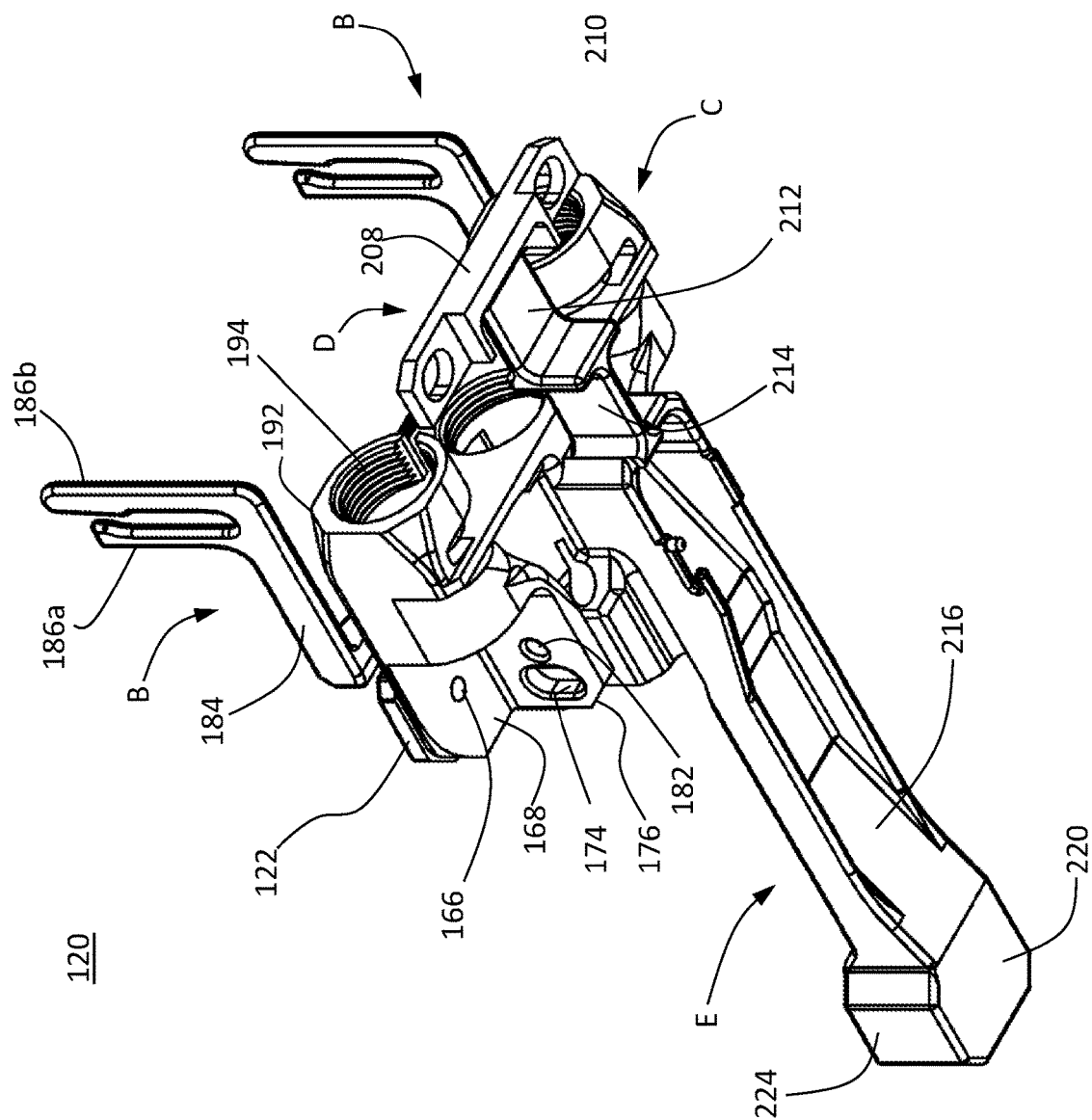
FIG. 3 is an isometric view of the optical bench appearing in FIG. 2, taken generally from below, the front, and left side.
Figure 4:
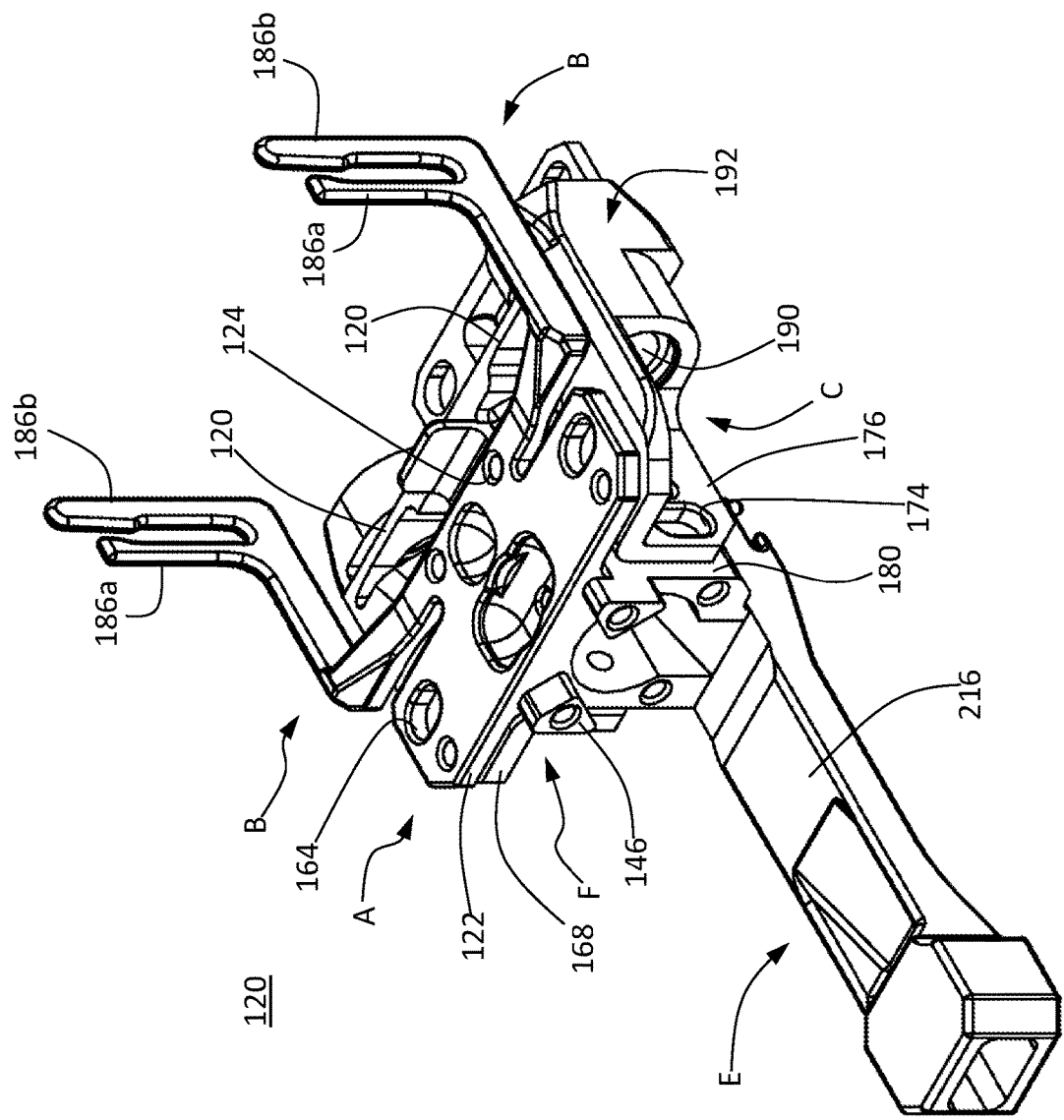
FIG. 4 is an isometric view of the optical bench shown in FIG. 3, taken generally from above, the back, and the left side.
Figure 5:
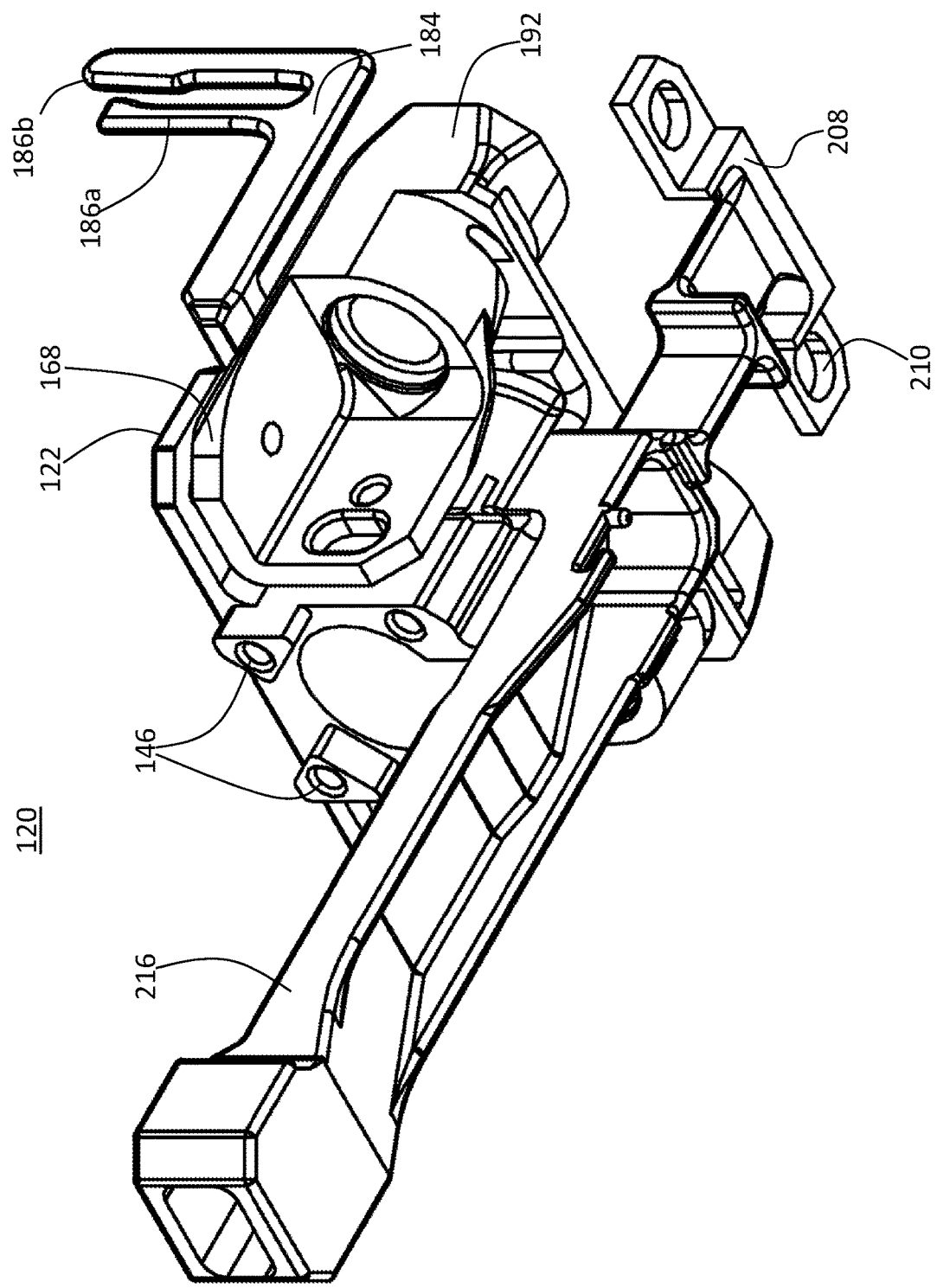
FIG. 5 is an isometric view of the optical bench shown in FIG. 3, taken generally from the back, bottom, and left side.
Figure 6:
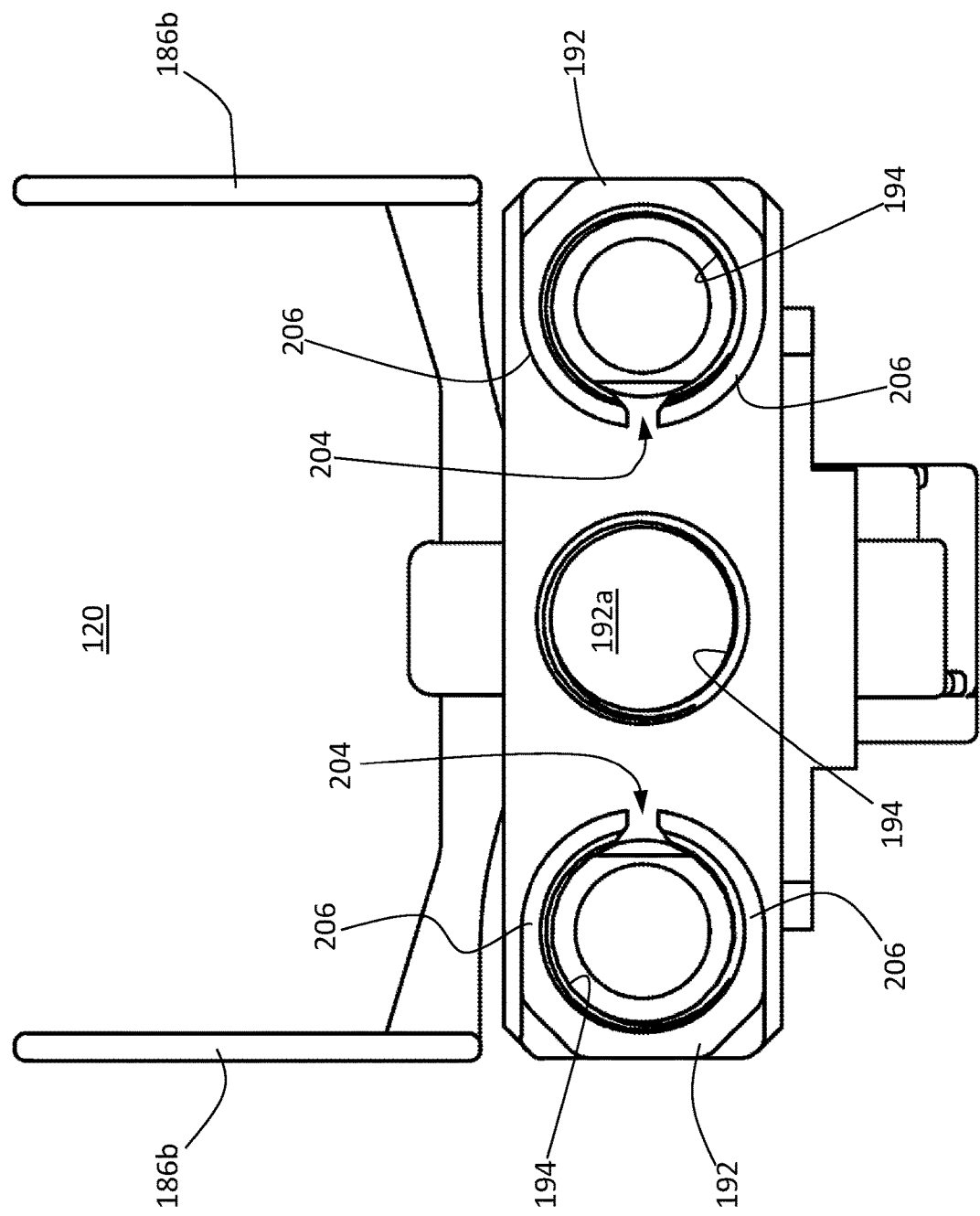
FIG. 6 is a front elevation view of the optical bench shown in FIG. 2.
Figure 7:
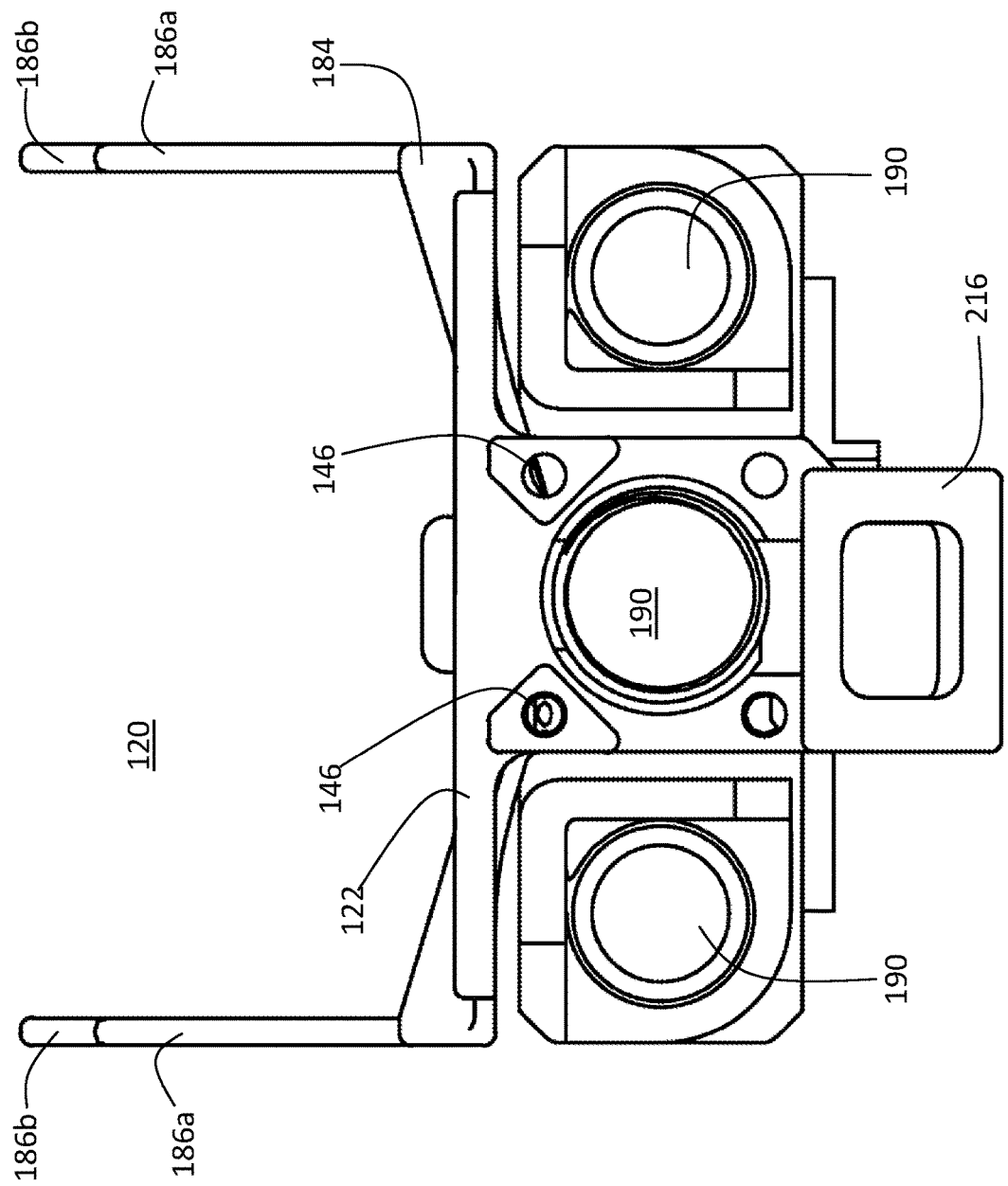
FIG. 7 is a rear elevation view of the optical bench shown in FIG. 2.
Figure 8:
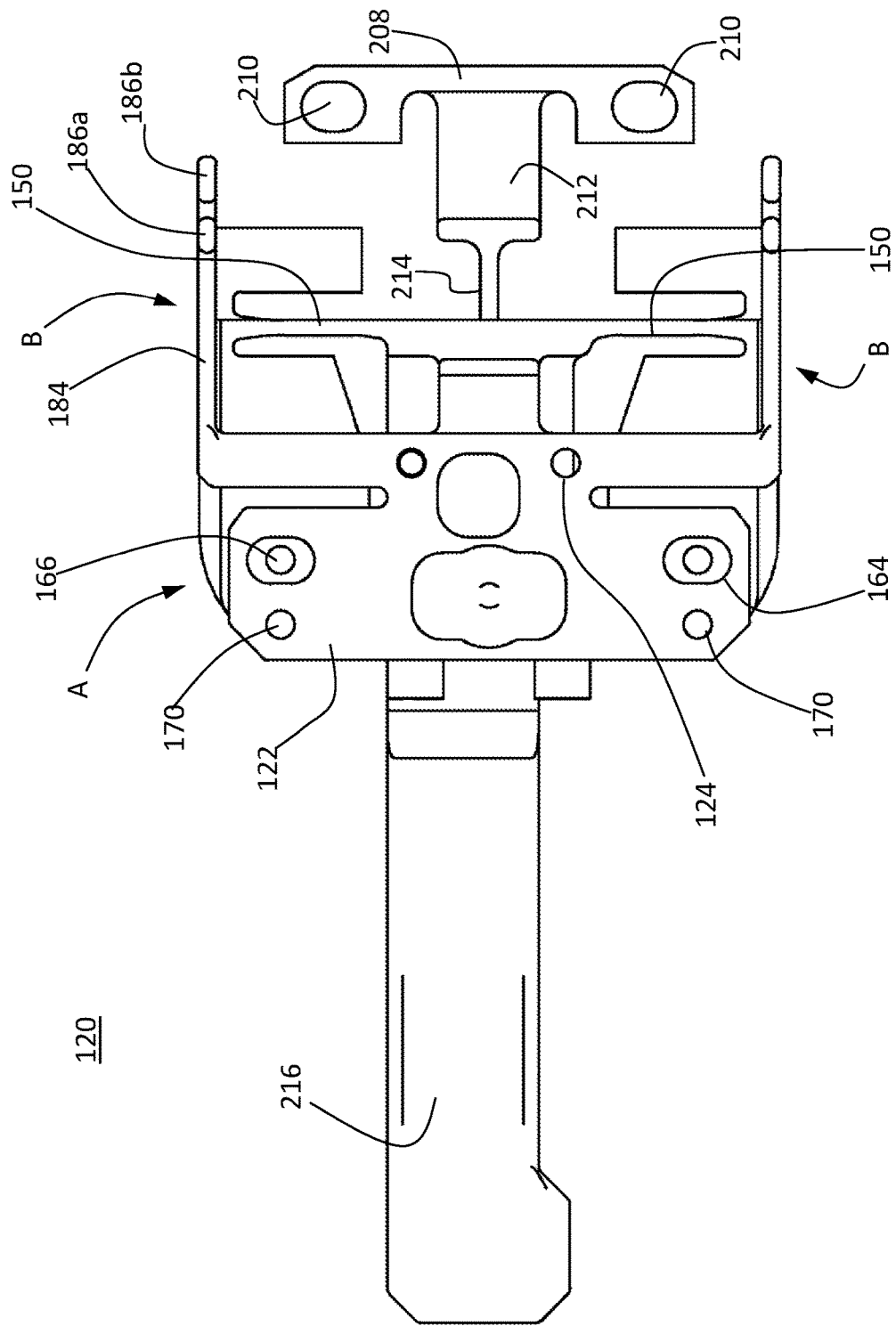
FIG. 8 is a top plan view of the optical bench shown in FIG. 2.
Figure 9:
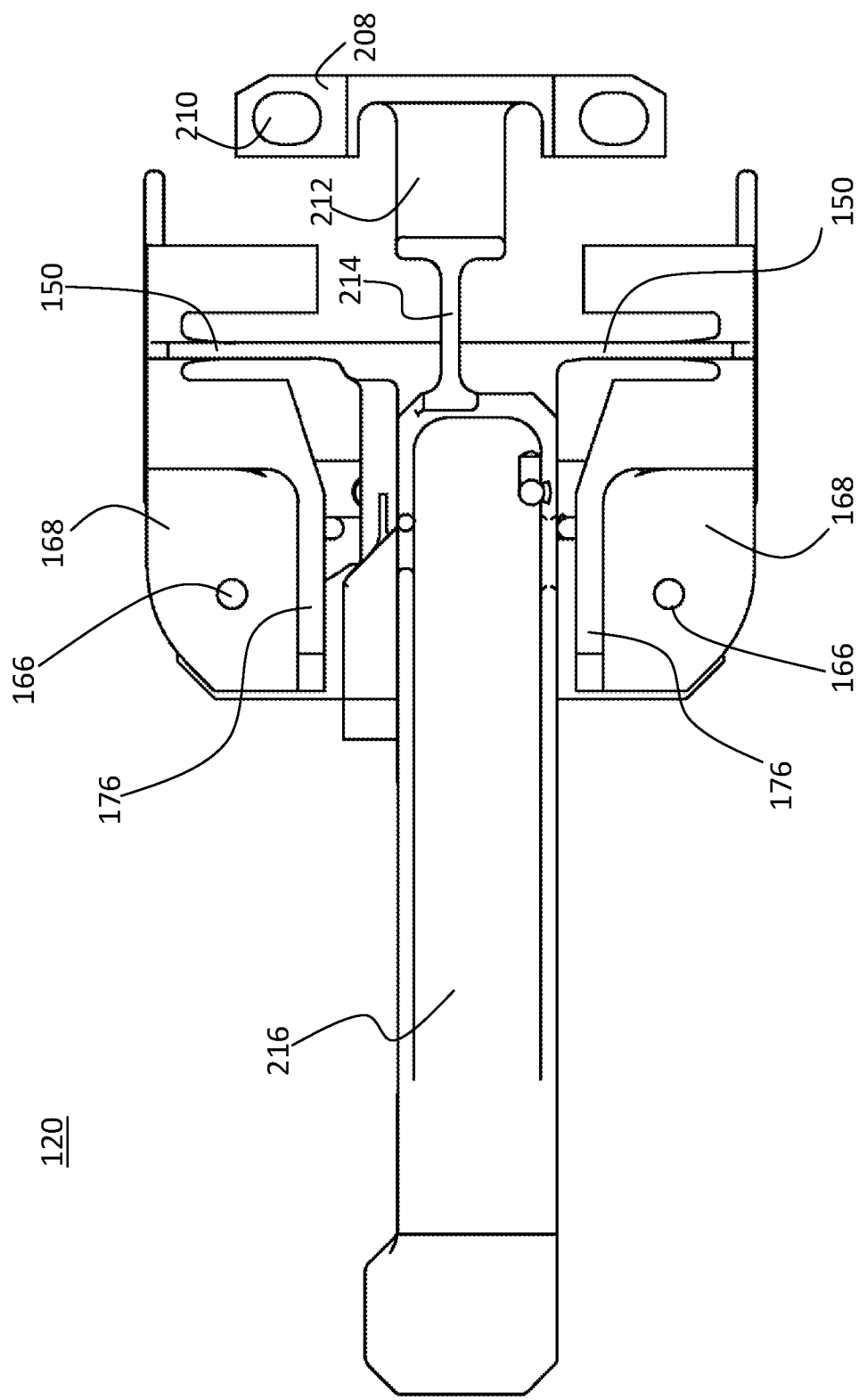
FIG. 9 is a bottom plan view of the optical bench shown in FIG. 2.
Figure 10:
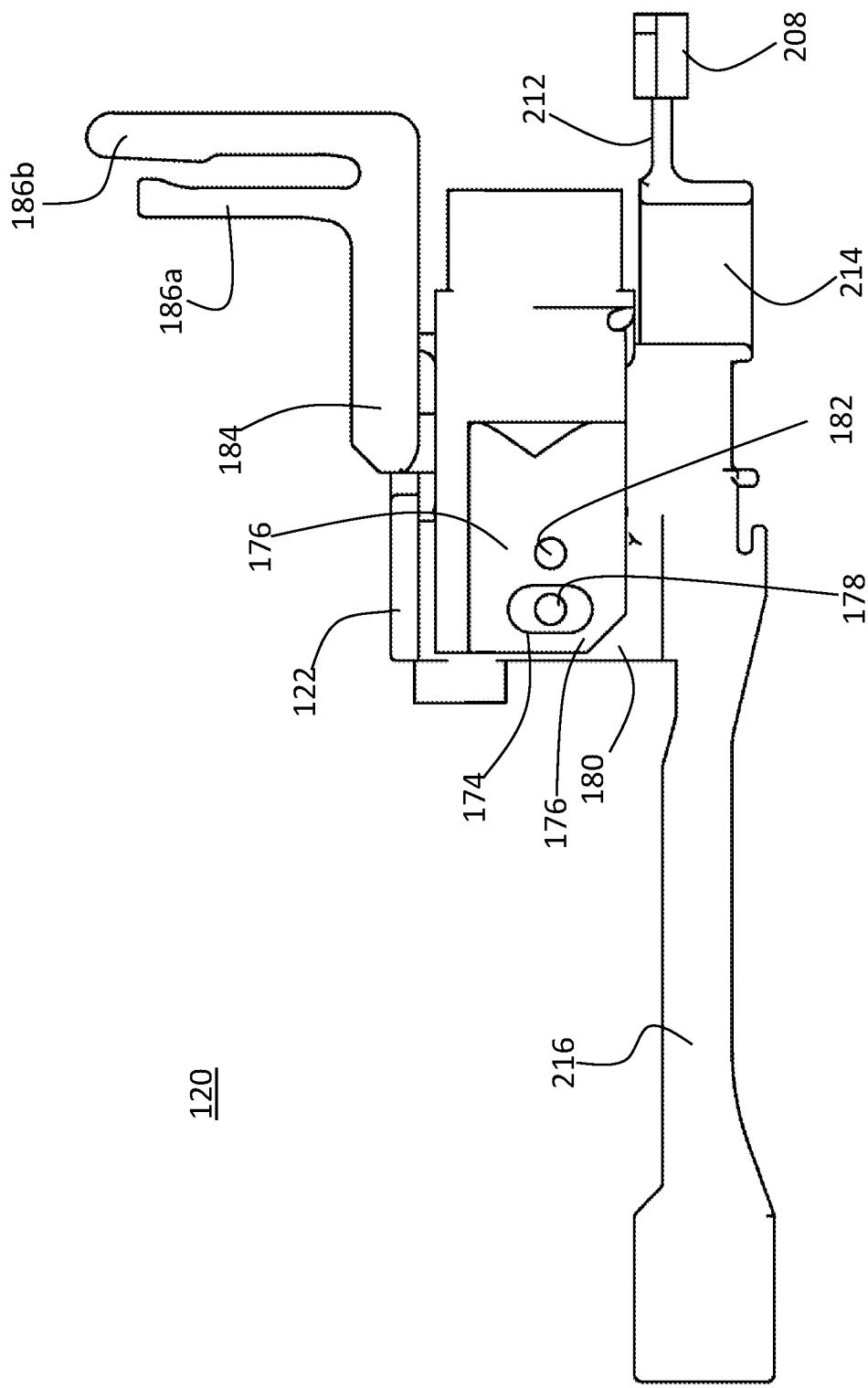
FIG. 10 is a left side elevation view of the optical bench shown in FIG. 2.
Figure 11:
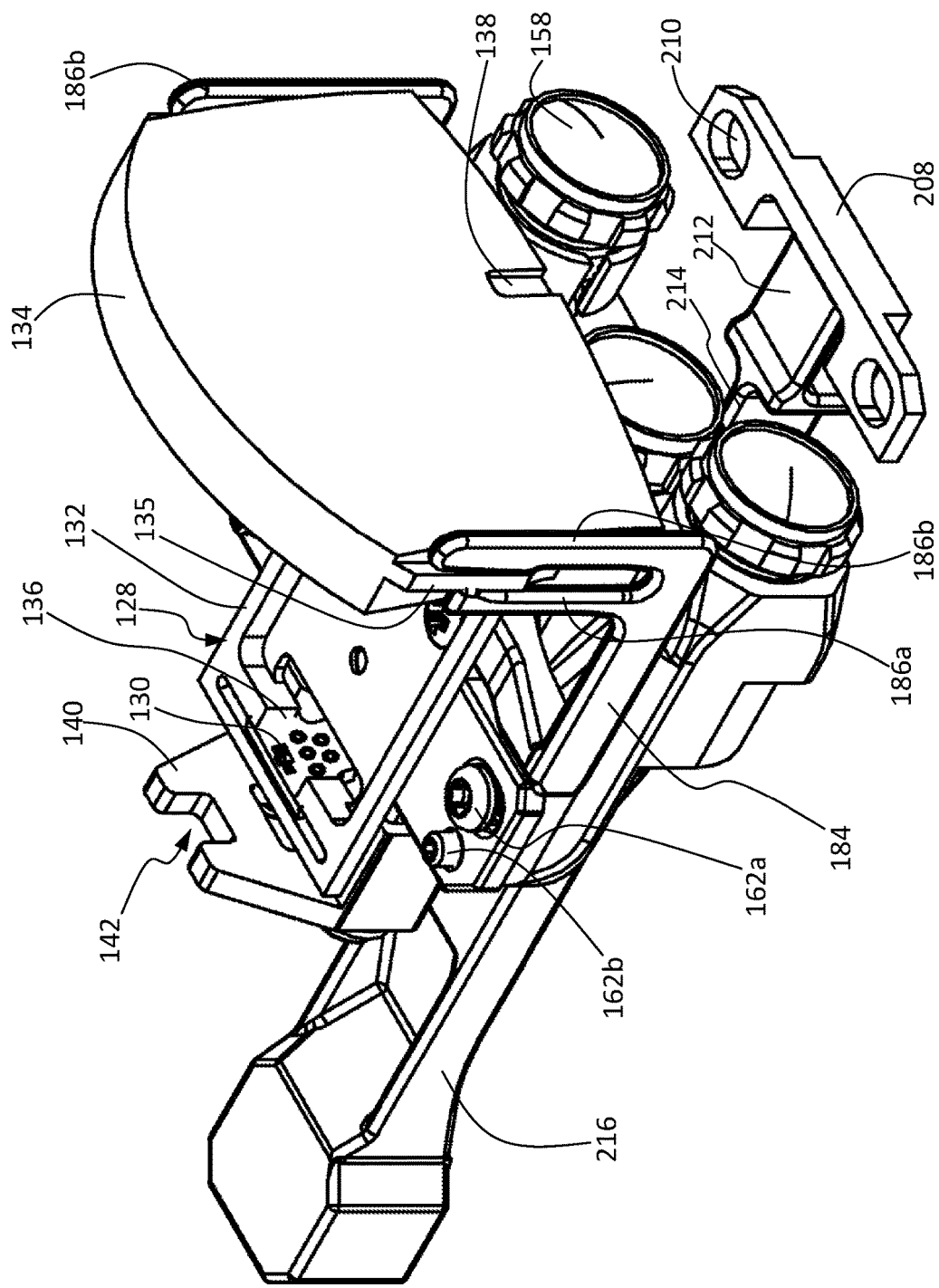
FIG. 11 is an isometric view of an optical bench assembly comprising the optical bench appearing in FIG. 2 with optical components attached, taken generally from above, the front, and the left side.
Figure 12:
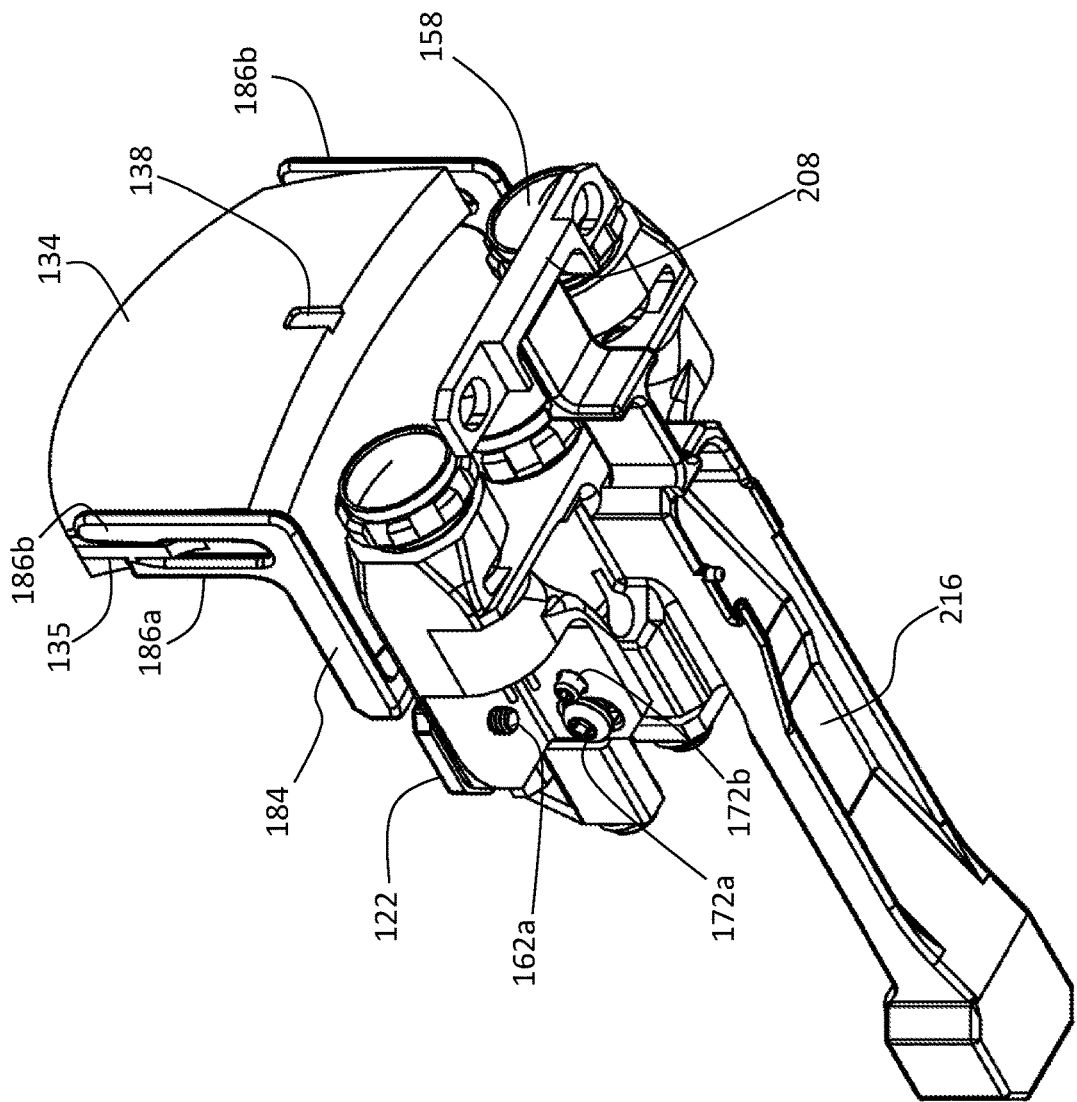
FIG. 12 is an isometric view of the optical bench assembly appearing in FIG. 11, taken generally from below, the front, and the left side.
Figure 13:
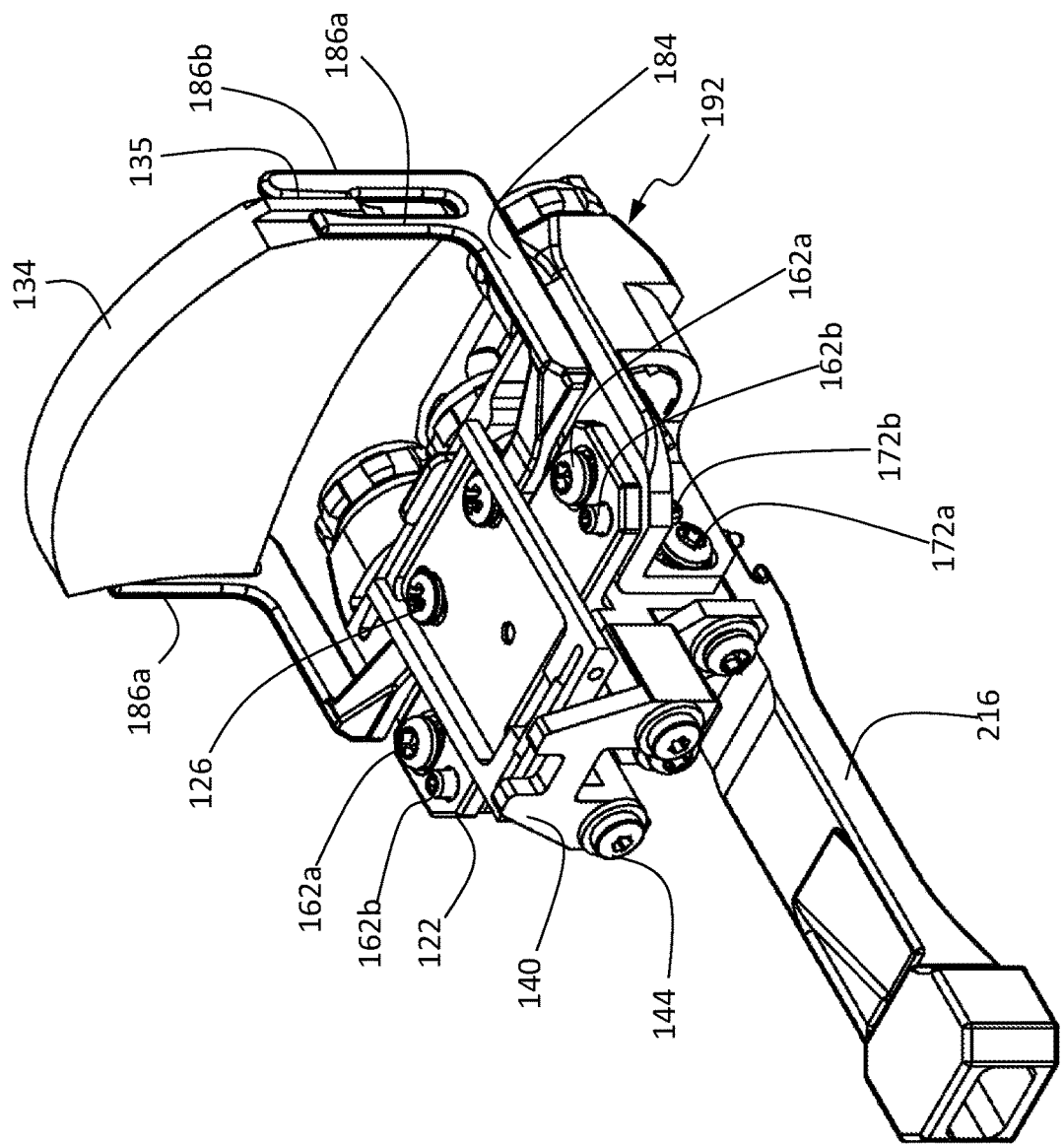
FIG. 13 is an isometric view of the optical bench assembly appearing in FIG. 11, taken generally from above, the rear, and the left side.
Figure 14:
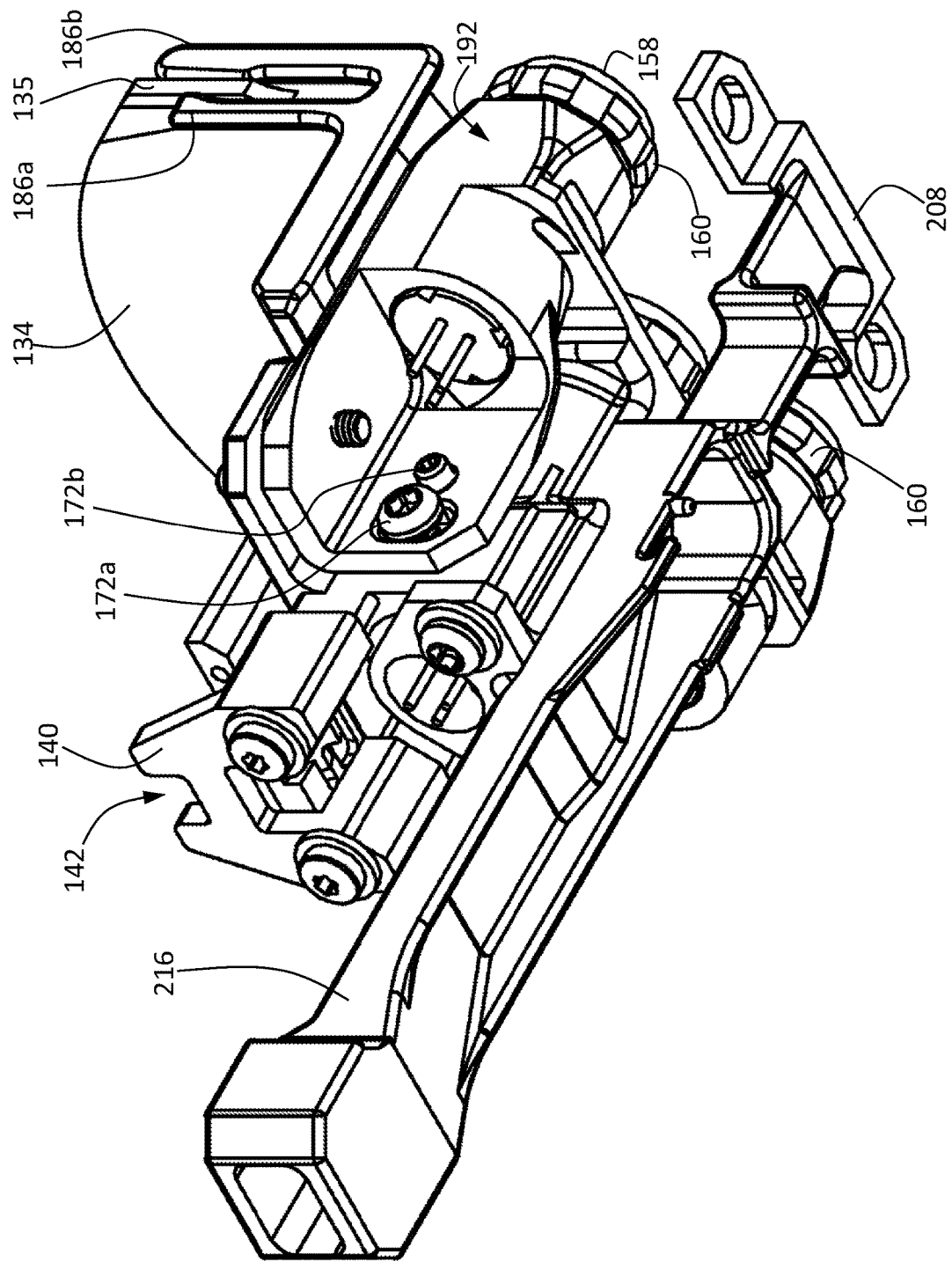
FIG. 14 is an isometric view of the optical bench assembly appearing in FIG. 11, taken generally from below, the rear, and the left side.
Figure 19:
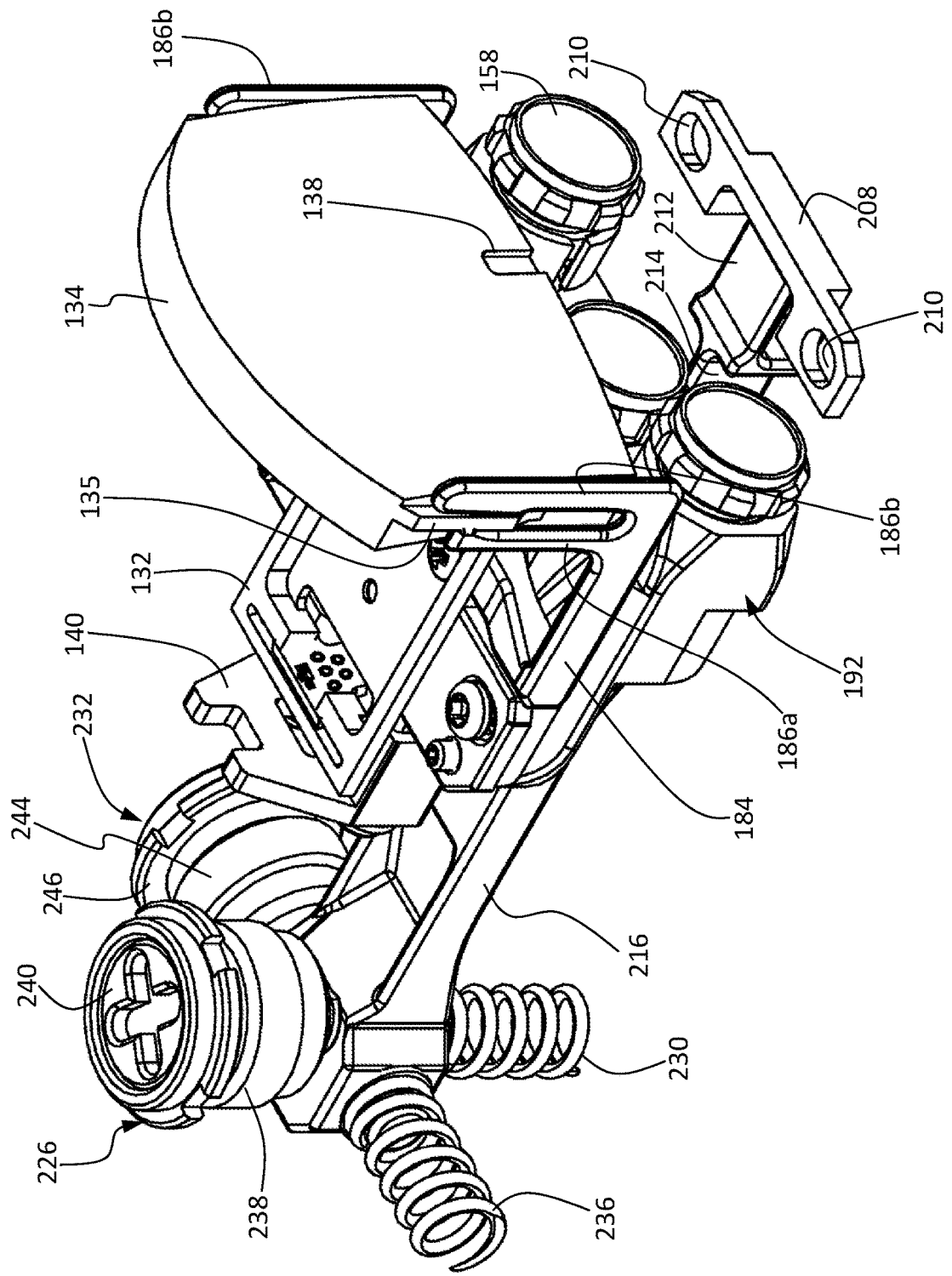
FIG. 19 is an isometric view of the optical bench assembly appearing in FIG. 11 and further comprising exemplary windage and elevation adjustment assemblies, taken generally from above, the front, and the left side.
Figure 20:
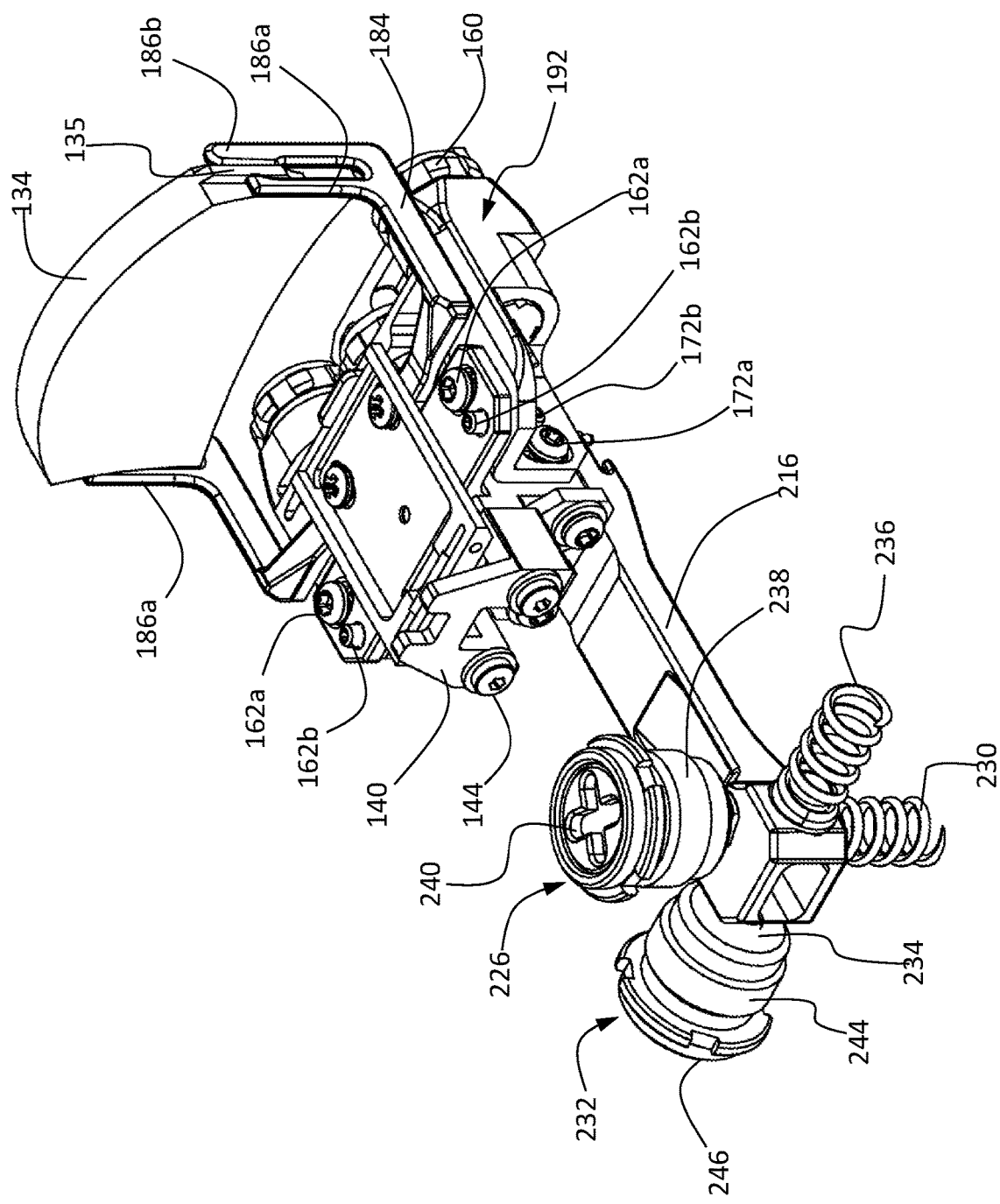
FIG. 20 is an isometric view of the optical bench assembly shown in FIG. 19, taken generally from above, the back, and the left side.
Figure 21:
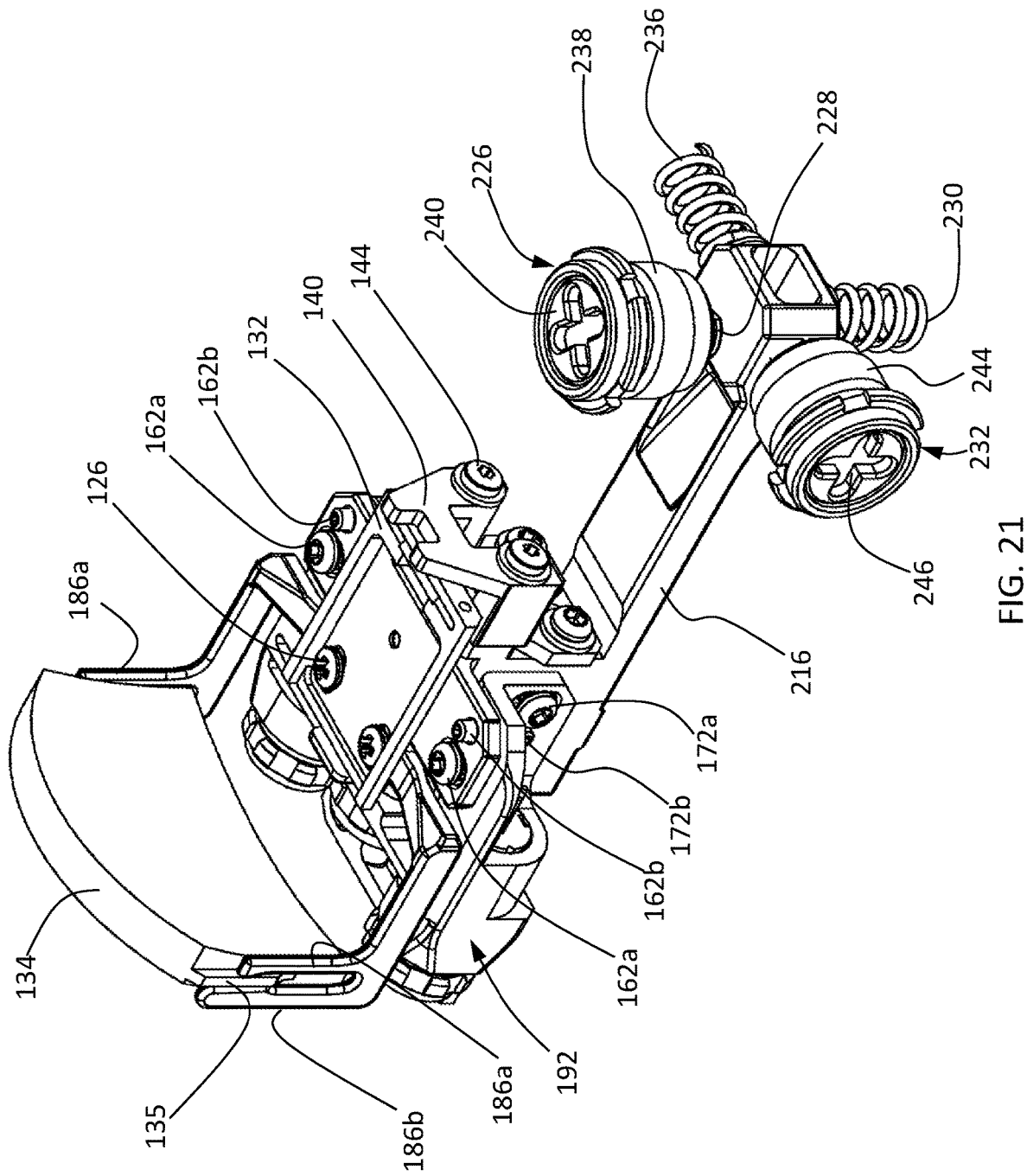
FIG. 21 is an isometric view of the optical bench assembly shown in FIG. 19, taken generally from above, the back, and the right side.

Referring now to the drawings, wherein like reference numerals represent like or analogous components throughout the several views, FIG. 1 illustrates an exemplary sight apparatus 110 including a reflex sight subassembly 112 having a housing or cover 114 and an aiming or pointing (and/or illumination) laser subassembly 116 having a housing 118. FIGS. 2-10 illustrate an optical bench 120 operable to support the optical (including electro-optical) components of the reflex sight subassembly 112 and the pointing laser subassembly 116. FIGS. 11-18 illustrate an optical bench assembly comprising the optical bench 120 and the associated optical components. FIGS. 19-21 illustrate the optical bench assembly appearing in FIGS. 11-18 in combination with associated elevation and windage adjustment assemblies.

As used herein, unless specifically stated otherwise, the terms "top," "bottom," "upper," "lower," "left,", "right", "horizontal," "vertical," "front", and "rear," and other such terms which are dependent on orientation are intended to refer to the orientation of the optical bench as shown in the drawings and consistent with the Brief Description of the Drawings, above. As used herein, an element or step recited in the singular and proceeded with the word "a" or "an" should be understood as not excluding plural of such elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising", "including," or "having" an element or a plurality of elements having a particular property may include additional such elements not having that property.

In certain embodiments, the optical bench 120 is formed as a single-piece structure in an additive manufacturing process. Additive manufacturing (also known as rapid prototyping and 3D printing) is the process of joining materials to make objects from 3D model data, usually layer upon layer, in contrast to casting or molding processes wherein a liquid or pliable material is poured or otherwise shaped using a mold or matrix of a desired shape, and subtractive manufacturing processes such as milling, machining, turning on a lathe, or other controlled material removal process. Exemplary additive manufacturing processes include stereolithography, fused deposition modeling, selective laser sintering, direct metal laser sintering, selective laser melting, and the like.

In certain embodiments of an additive manufacturing process operable to manufacture the optical bench 120, the optical bench 120 is first modeled using computer-aided design (CAD) software or 3D-modeling software. Next, a digital file representative of the three-dimensional shape of the optical bench 120 is uploaded to an additive manufacturing computer where the pre-processing software slices the model into a number of thin layers. An additive manufacturing machine lays down a build material such as powdered metals, powdered plastics, UV curable polymers, and others, in layer-upon-layer fashion to fabricate the optical bench 120. In certain embodiments, the optical bench 120 is formed of sintered titanium, although other materials are also contemplated, including plastics, other metals, and ceramics. It will be recognized that the optical bench 120 may be manufactured using additive manufacturing processes as are generally known, as well as modifications or improvements to additive manufacturing processes developed in the future.

In certain embodiments, the optical bench 120 comprises a monolithic or single-piece mechanical structure having a reflex sight mounting portion, designated generally as A, reflex lens mounting arms, designated generally as B, an aiming and/or illumination laser receptacle portion, designated generally as C, a mounting portion, designated generally as D, for securing the optical bench within the housing 118 of the sight apparatus 110, a bore sight adjustment lever, designated generally as E, and a rear sight mounting portion, designated generally as F. Unless specifically stated otherwise, the terms "aiming laser," "pointing laser," and "targeting laser" are used herein interchangeably to mean a laser generally aligned with the barrel of a weapon or firearm (with or without allowance for ballistic drop, windage, distance to target, offset between the beam axis and the axis of the barrel, and so forth) for placing a spot on a desired target, without regard to nuances in connotation.

The reflex sight mounting portion A, comprises a reticle platform or surface 122 having a plurality of openings 124 for receiving threaded fasteners 126 securing a reticle light source assembly 128 to the platform 122. The reticle light source assembly 128 includes a light source 130 carried on a reticle sled or frame 132. In certain embodiments, the frame 132 is formed of aluminum. The light source 130 may be any suitable light source, such as an LED or laser, e.g., an eye-safe laser. The light source assembly 128 is attached to a surface 122 via the threaded fasteners 126 engaging aligned openings in the reticle sled 132.

The light source 130 emits light that impinges on a lens assembly 134. The lens assembly 134 functions as a partially reflective mirror (e.g., beam splitter or dichroic mirror), for example, which may include a reflective coating or film therein to reflect a portion of the light emitted from the light source 130 back toward the user.

In certain embodiments, the light from the light source 130 is preferably collimated, e.g., using a collimating lens. The lens assembly 134 also allows light reflected from the target field of view to pass through, wherein the collimated light from the light source 130 appears as a superimposed reticle on the target field of view. The superimposed reticle may appear as a dot, e.g., a red or green dot, although other reticle colors and shapes, such as rings and cross hairs are also contemplated.

The horizontal and vertical position of the collimated light from the light source 130 on the lens assembly 134 is adjusted using threaded adjustment screws 136. The adjustment screws 136 therefore provide elevation and windage adjustments, respectively, for the reflex sight subassembly 112. Once the light source 130 and the laser elements of the laser sight, as described below, have been coaligned, a potting compound may be used to maintain the light source 130 in its aligned position. In certain embodiments, the lens assembly 134 includes a plastic reflex lens, such as an acrylic reflex lens. In other embodiments, the lens assembly 134 includes a glass lens.

In certain embodiments, sight apparatus includes alignment markers, i.e., so-called "iron sights." The iron sights may be used, for example, as a backup aiming system in the event the unit 110 malfunctions or the power supply is depleted. In the illustrated embodiment, the lens assembly 134 includes an iron sight system comprising a front sight 138 embedded in the reflex lens and a rear sight 140 attached to the rear sight mounting portion F. Although a post type front sight is illustrated, it will be recognized that other configurations, such as bead or ring type front sight, are also contemplated. The rear sight 140 is attached to the a rear sight mounting portion F via threaded fasteners 144 engaging openings 146 in the rear sight mounting portion F. In the illustrated embodiment, the rear sight 140 is configured as an open sight having a notch 142. It will be recognized that other rear sight configurations are also contemplated, such as a rear sight having an aperture instead of a notch.

The optical bench 120 includes a pair of flexures 150 for adjusting the pointing direction of the aiming laser assemblies 152, each of which comprises a laser diode 154 and an aiming laser lens assembly 156. The aiming laser lens assembly 156, in turn, comprises a lens 158, e.g., a collimating lens, and a lens mount 160. The rotation or pivoting movement of the aiming laser assembly 156 about a transverse horizontal axis in relation to the platform 122 is adjusted using threaded adjustment screws 162*a* and 162*b*. The screw 162*a* passes through an enlarged diameter clearance opening 164 in the platform 122 and rotatably engages a threaded opening 166 a bench surface 168 in the aiming laser portion C. Rotation of the screw 162*a* selectively moves the bench surface in relation to the platform 122 in a desired direction depending on the direction of rotation. The screw 162*b* engages a threaded opening 170 in the platform 122 and bears against the bench surface 168. Rotation of the screw 162*b* selectively moves the bearing end of the screw 162*b* toward or away from the bench surface 168, depending on the direction of rotation. In this manner, the orientation of the bench surface 168 with respect to the platform 122 can be adjusted, with pivoting movement occurring by torsion at the flexures 150, to provide an elevation adjustment of the aiming laser assembly 152.

The horizontal position (windage) of the aiming laser assemblies 152 is adjusted using threaded adjustment screws 172*a* and 172*b*. The flexures 150 are resilient, allowing the aiming laser assemblies 152 to pivot about the short axis of the flexures 150. The screw 172*a* passes through an enlarged diameter clearance opening 174 in a bench side platform 176 and rotatably engages a threaded opening 178 a bench side surface 180 in the aiming laser portion C. Rotation of the screw 172*a* selectively moves the bench side surface 180 in relation to the bench side platform 176 in a desired direction depending on the direction of rotation. The screw 172*b* engages a threaded opening 182 in the side platform 176 and bears against the bench side surface 180. Rotation of the screw 172*b* selectively moves the bearing end of the screw 172*b* toward or away from the bench side surface 180, depending on the direction of rotation. In this manner, the position of the bench side surface 180 with respect to the side platform 176 can be adjusted, with movement occurring by bending pivoting movement (flexion) at the flexures 150, to adjust the windage of the aiming laser.

The lens assembly 134 is retained by a pair of flexible mounting arms B, situated on opposing sides of the lens assembly 134. In certain embodiments, each lens mounting arm B includes a horizontal (in the orientation shown in FIG. 10) arm 184 and two upstanding arms 186*a*, 186*b*, defining a split lens holder, extending from the distal end of the arm 184. It will be recognized that the illustrated arm geometries are exemplary only and other arm geometries are contemplated. The arms 186*a*, 186*b* are configured to clamp a side portion or protrusion 135 on opposite sides of the lens assembly 134. In alternative embodiments, the split lens holder may be omitted. The lens assembly flexures B are resilient with multiple degrees of movement, e.g., flexion of the arms 184, torsion of the arms 184, and flexion of the arms 186*a*, 186*b*, to accommodate thermal expansion and contraction of the lens assembly 134. The resiliency of the lens assembly flexures B allows for compensation for the expansion of the lens assembly 134 induced by heat, for example, resulting from discharge of the weapon or other heat source. In certain embodiments, the lens assembly flexures B are configured to be able to spread outward and retract inward to allow for lens assembly expansion and contraction while substantially retaining the lens assembly 134 in place. This advantageously allows for the use of lens materials with a relatively high coefficient of thermal expansion, such as plastics, thereby enabling a reduction in manufacturing costs.

The laser receptacle portion C includes one or more receptacles 190 formed in the portion C for supporting one or more laser emitters 154, e.g., laser diodes. In certain preferred embodiments, the laser receptacle portion C has three receptacles 190 and three respective laser emitters 154. In certain embodiments, the laser emitters include a visible target pointing or aiming laser, an infrared (IR) target pointing or aiming laser, and an IR illuminator or flood light laser. In certain embodiments, the coalignment of laser emitters 154 is effected purely mechanically.

One or more lens receptacles 192 are formed in the portion C and each is optically aligned with a respective one of the laser diode receptacles 190 and are configured to receive a lens assembly 156. Each lens assembly 156 includes a laser focusing lens 158 and a lens holder 160. The lens holder 160 includes external threads 202 which are complementary with internal threads 194 in the receptacles 192. In certain embodiments, one or more of the receptacles 192 include an axially extending slot or gap 204, thereby defining resiliently flexible threaded flexure elements 206, which are curved arms configured to resiliently expand outward. In certain embodiments, the threaded end of the lens holders 160 are configured to have negative clearance in relation to the internal diameter of the receptacles 192, tending to urge the threaded flexure elements 206 outward and creating a spring force against the lens holder 160. The resiliency of the threaded flexure elements 206 allows for rotational adjustment of the lens assembly 156 by axially advancing or retracting (depending on the direction of rotation) the lens, i.e., to position the laser diode at the focal length of the lens, while limiting movement during operation.

In the illustrated embodiment, the optical bench includes two lens receptacles 192 with resilient flexure elements 206 on opposite sides of a center lens receptacle 192*a*. In certain embodiments, the receptacles 192 are configured to hold lens assemblies for aiming/pointing lasers (e.g., visible and IR laser diodes) and the center lens receptacle 192a is configured to hold a lens assembly for an illumination/flood laser (e.g., IR laser diode). It will be recognized that other configurations with other numbers of lasers and lasers having other wavelengths are contemplated.

The optical bench mounting portion D includes a mounting member 208 having one or more apertures 210 for receiving one or more fasteners (not shown), to fasten the optical bench within the housing 118.

The mounting member 208 is connected to a first flexure 212 comprising a generally horizontal web of material configured to flex or pivot about a horizontal axis and resist flexing about vertical axis. The first flexure 212, in turn, is connected to a second flexure 214 comprising a generally vertical web extending between the first flexure 212 and the laser receptacle portion C. The second flexure 214 is configured to flex or pivot about a vertical axis and resist flexing about a vertical axis.

The resiliency of the first flexure 212, allows the optical bench 120 to pivot in response to a vertical force exerted on the optical bench 120, thereby allowing alignment of the optical bench 120 to be adjusted relative to the housing, thus providing a vertical (elevation) adjustment of the laser beams emitted by the lasers. Likewise, the resiliency of the second flexure 214 allows the optical bench 120 to pivot in response to a horizontal force exerted on the optical bench 120, thereby allowing alignment of the optical bench 120 to be adjusted relative to the housing 118, thus providing a horizontal (windage) adjustment of the laser beams emitted by the lasers.

The bore sight adjustment lever E comprises an arm 216 extending from the laser receptacle portion C. The distal end of the arm 216 includes a generally horizontal elevation adjustment bearing surface 218 and an elevation counter spring bearing surface 220 opposite the elevation adjustment bearing surface 218. The distal end of the arm 216 also includes a generally vertical windage adjustment bearing surface 222 and a windage counter spring bearing surface 224 opposite the windage adjustment bearing surface 222.

An elevation adjustment assembly 226 is mounted to the housing 118 and includes an elevation bearing member 228, which bears against the surface 218. An elevation adjustment counter spring 230 is captured within the housing and bears against the surface 220. Rotational adjustment of the elevation adjustment assembly 226 in one direction causes the lever arm 216 to move downward against the bias of the spring 230 and causes the optical bench 120 to pivot about the first flexure 212, thereby raising the aim point of the aiming lasers in relation to the housing 118 and, in turn, relative to the barrel of the weapon to which the unit 110 is attached.

Similarly, rotational adjustment of the elevation adjustment assembly 226 in the opposite direction allows the spring 230 to urge the lever arm 216 upward and causes the optical bench 120 to pivot about the first flexure 212, thereby lowering the aim point of the aiming lasers in relation to the housing 118 and, in turn, relative to the barrel of the weapon to which the unit 110 is attached.

A windage adjustment assembly 232 is mounted to the housing and includes a windage bearing member 234, which bears against the surface 222. A windage adjustment counter spring 236 is captured within the housing 118 and bears against the surface 224. Rotational adjustment of the windage adjustment assembly 232 in one direction causes the lever arm 216 to move to the left against the bias of the spring 236 and causes the optical bench 120 to pivot about the second flexure 214, thereby moving the aim point of the aiming lasers to the right in relation to the housing 118 and, in turn, relative to the barrel of the weapon to which the unit 110 is attached.

Similarly, rotational adjustment of the windage adjustment assembly 232 in the opposite direction allows the spring 236 to urge the lever arm 216 to the right and causes the optical bench 120 to pivot about the second flexure 214, thereby moving the aim point of the aiming lasers to the left in relation to the housing 118 and, in turn, relative to the barrel of the weapon to which the unit 110 is attached.

In certain embodiments, the elevation adjustment assembly 226 includes a sleeve 238, which rotatably receives a rotatable barrel 240. The sleeve 238, in turn, is received within an opening 242 in the housing 118. The rotatable barrel 240 includes the bearing member 228 which protrudes from the open end of the sleeve and engages the surface 218 on the lever arm 216 as described above. An exterior helical thread (not shown) on the barrel 240 engages a complementary interior thread (not shown) on the interior of the sleeve 238, such that rotation of the barrel in one direction causes the bearing member to advance toward the respective surface against the urging of the spring and rotation of the barrel in the other direction causes the bearing member to move away from the respective bearing surface.

In certain embodiments, the windage adjustment assembly 232 includes a sleeve 244, which rotatably receives a rotatable barrel 246. The sleeve 244, in turn, is received within an opening 248 in the housing 118. The rotatable barrel 246 includes the bearing member 234 which protrudes from the open end of the sleeve and engages the surface 222 on the lever arm 216 as described above. An exterior helical thread (not shown) on the barrel 246 engages a complementary interior thread (not shown) on the interior of the sleeve 244, such that rotation of the barrel in one direction causes the bearing member to advance toward the respective surface against the urging of the spring and rotation of the barrel in the other direction causes the bearing member to move away from the respective bearing surface.

In certain embodiments, the elevation and windage adjustment assemblies 226, 232 may be as described in commonly owned U.S. Pat. No. 9,752,853, the entire contents of which are incorporated herein by reference.

Figure 15:
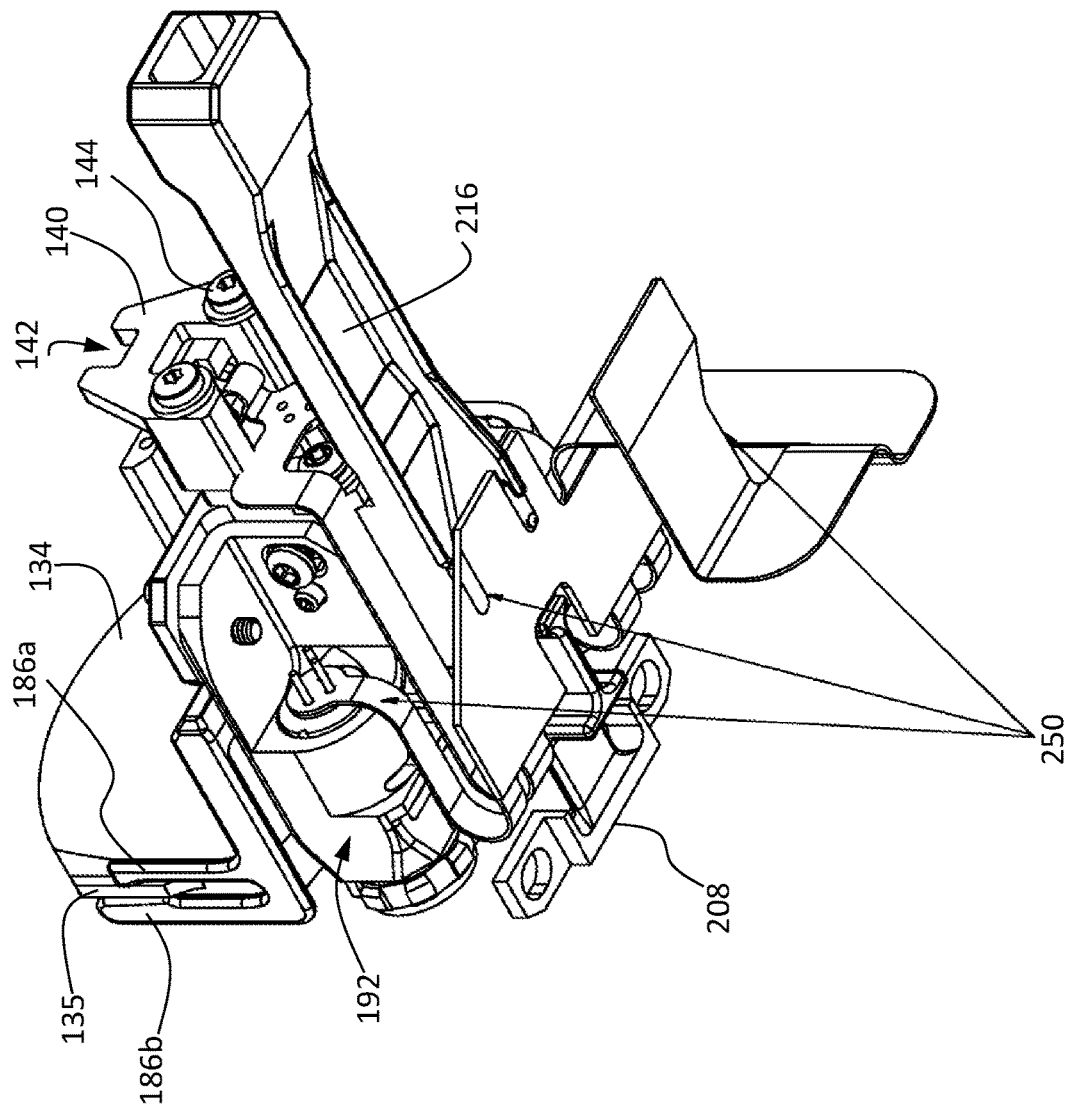
FIG. 15 is an isometric view of the optical bench assembly shown in FIG. 11, and further illustrating a flex cable connecting components of the sight, taken generally from below, the back, and the right side.
Figure 16:
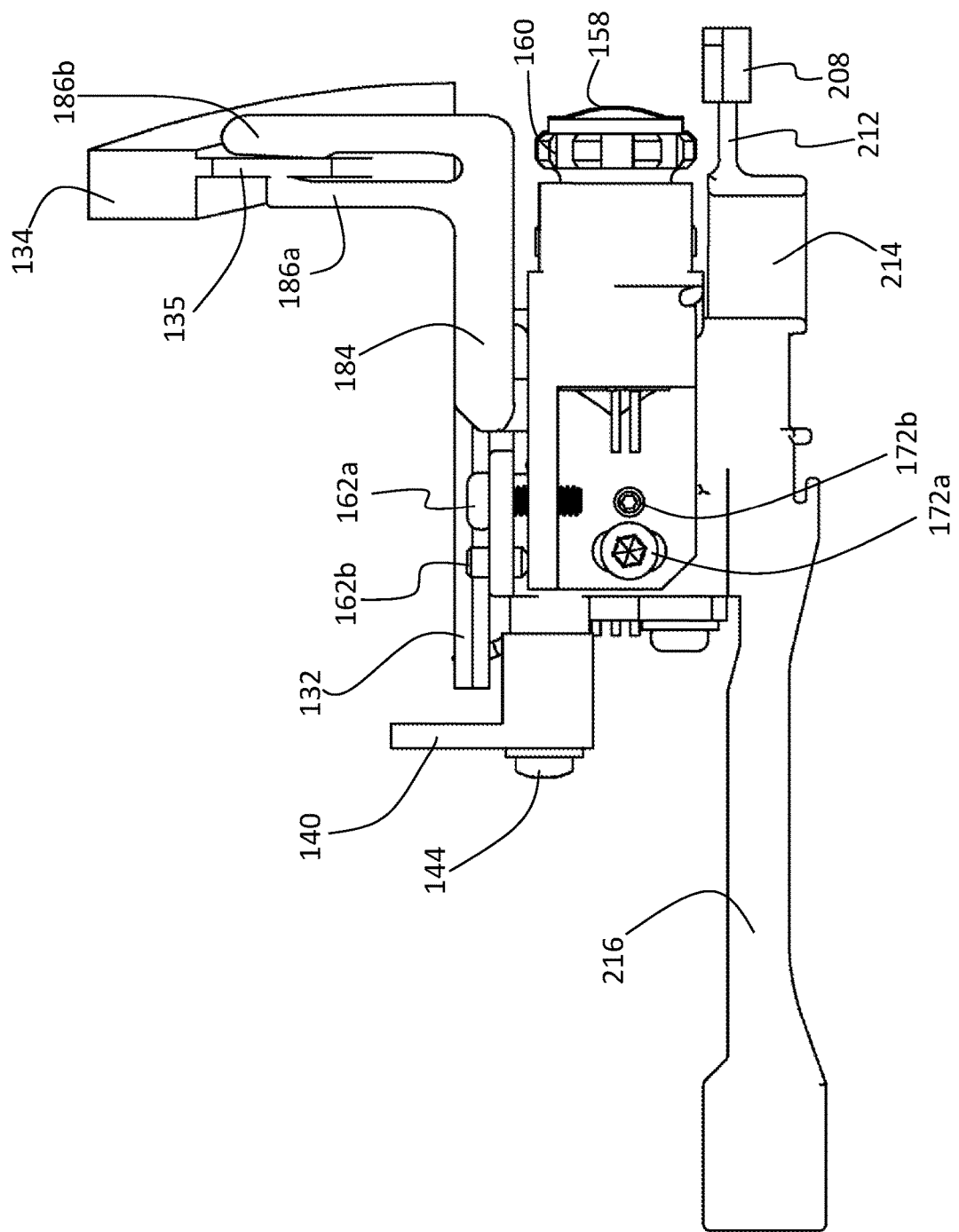
FIG. 16 is a left side elevation view of the optical bench assembly shown in FIG. 11.
Figure 17:
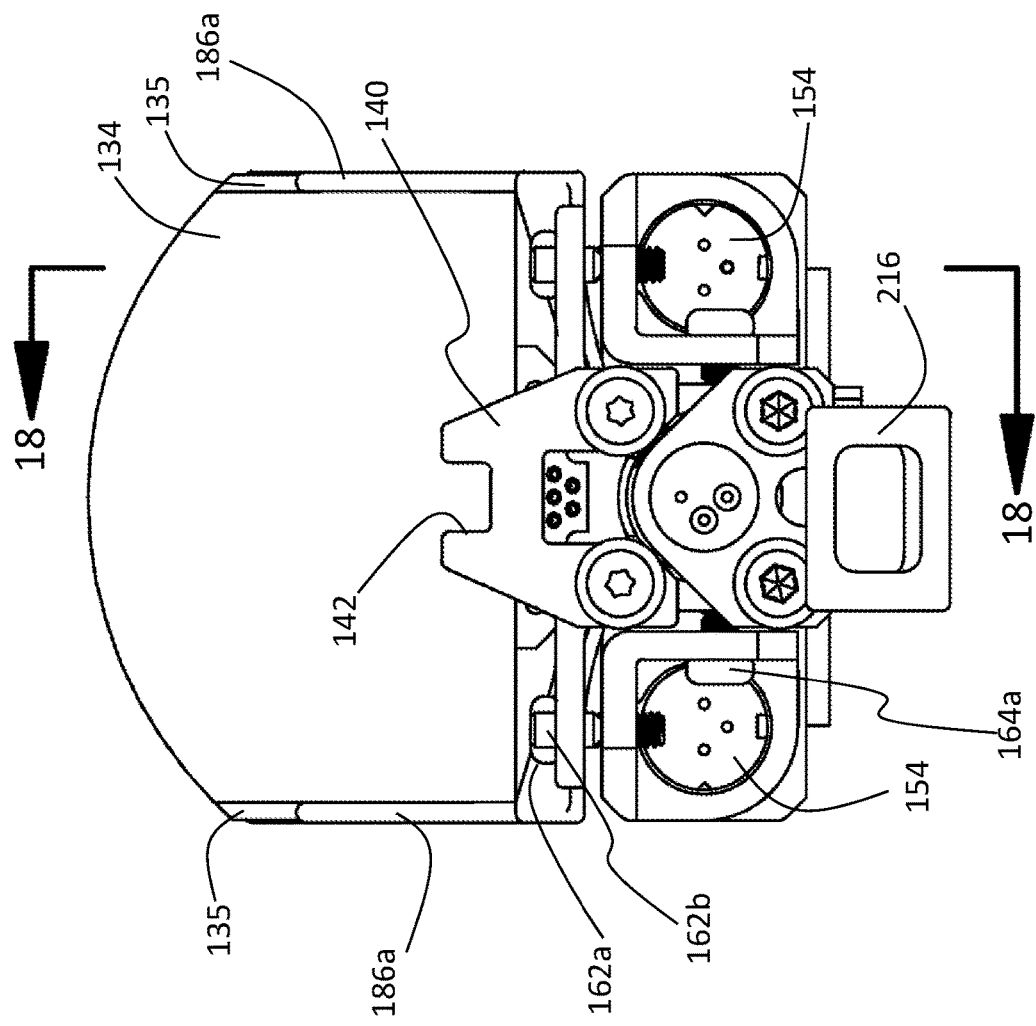
FIG. 17 is rear elevation view of the optical bench assembly shown in FIG. 11.
Figure 18:
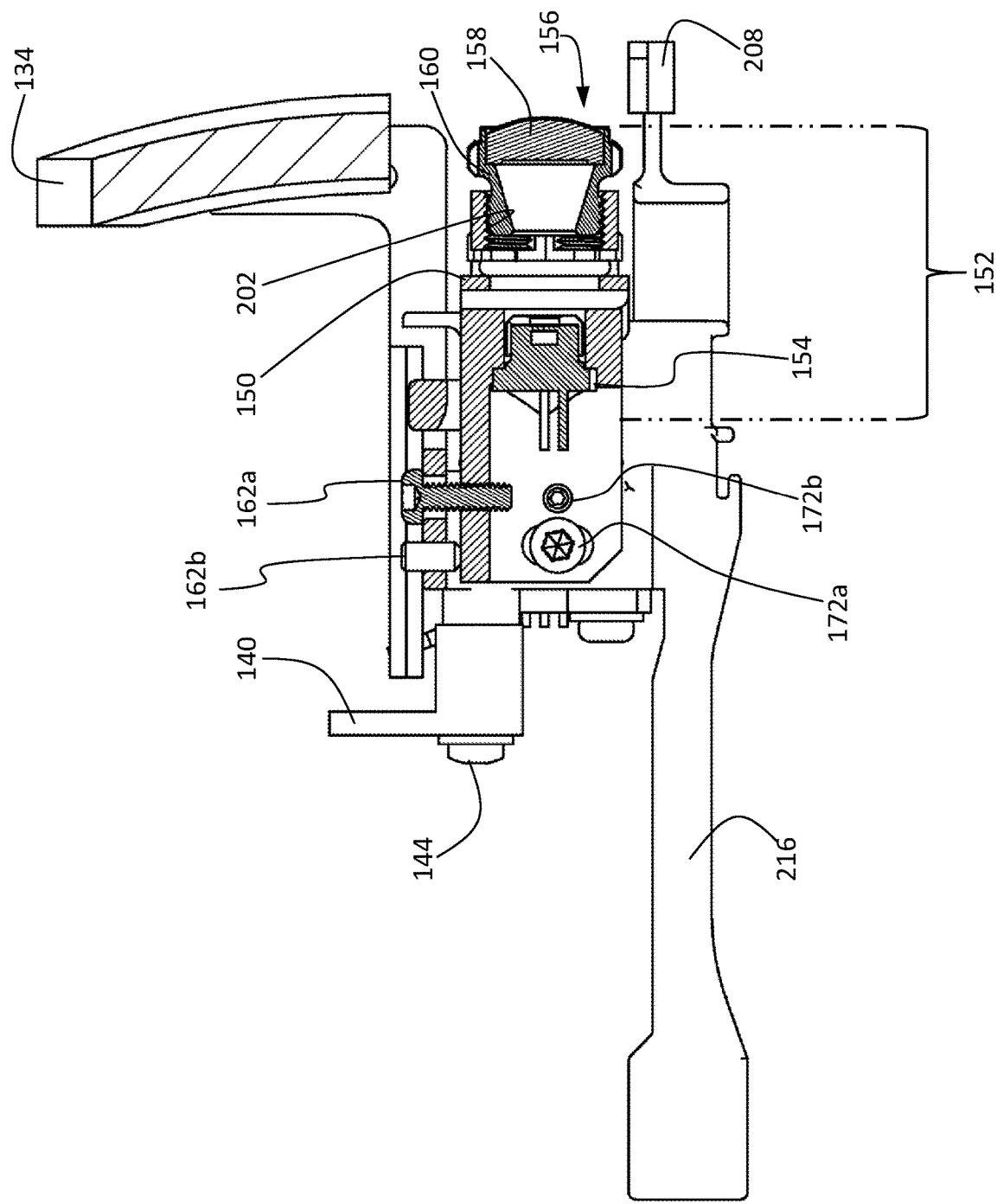
FIG. 18 is a left side cross-sectional view of the optical bench assembly taken along the lines 18-18 appearing in FIG. 17.

As best seen in FIG. 15, in certain embodiments the optical bench includes a flex cable 250, e.g., comprising circuit elements and conductive traces on a flexible circuit substrate configured to connect electrical components, such as laser diodes, light sensor, and reticle light element, power supply, and so forth. Other flexible conductors are contemplated, such as a ribbon cable or the like.

Various aspects of the present development are contemplated, including the following:

An optical bench for supporting a reflex sight in a weapon-mounted sight assembly, the optical bench comprising a reflex sight mounting portion having a first surface for receiving a reticle light source, a first reticle lens mounting arm spaced apart from a second reticle lens mounting arm, the first and second reticle lens mounting arms attached to the reflex sight mounting portion, and the first and second reticle lens mounting arms configured to engage opposite sides of a reticle lens to support the reticle lens in an optical path of the reticle light source, the first and second reticle lens mounting arms being sufficiently resilient to accommodate thermal expansion and contraction of the reticle lens.

An optical bench wherein the reflex sight mounting portion is formed with the first and second reticle lens mounting arms as a monolithic structure.

An optical bench wherein the monolithic structure is defined as a series of additive manufactured layers built upon each other.

An optical bench wherein the first and second reticle lens mounting arms are resilient with multiple degrees of movement.

An optical bench wherein each of the first and second reticle lens mounting arms have a horizontal segment attached to reflex sight mounting portion and a vertical segment disposed at a distal end of the horizontal segment.

An optical bench wherein the horizontal segment is configured for both flexion movement and torsion movement responsive to thermal expansion and contraction of the reticle lens, and each vertical segment comprises a pair of upstanding arms defining a clip configured to engage a complementary protrusion on the reticle lens, wherein the pair of upstanding arms are configured for flexion movement responsive to thermal expansion of the reticle lens.

An optical bench further comprising one or both of a reticle frame removably attached to the first surface, the reticle frame configured to carry the reticle light source and a rear iron sight removably attached to the first surface.

An optical bench further comprising an aiming laser portion and one or more aiming laser flexures connecting the aiming laser portion to the reflex sight mounting portion, wherein the aiming laser portion is pivotable about the one or more aiming laser flexures for adjusting an angular orientation of the aiming laser portion in relation to the reflex sight mounting portion.

An optical bench wherein the aiming laser portion is configured to pivot responsive to torsion, flexion, or both at the one or more flexures.

An optical bench wherein each of the one or more flexures extends transversely with respect to an optical axis of the optical bench and each of the one or more flexures has a long axis and a short axis, the optical bench further comprising a horizontal bench surface spaced apart from the reticle mounting portion, a first set of one or more threaded fasteners which are rotatable to move the reticle mounting portion in relation to the horizontal bench surface, a bench side surface attached to the reticle mounting portion, a vertical bench surface spaced apart from the bench side surface, a second set of one or more threaded fasteners which are rotatable to move the bench side surface in relation to the vertical bench surface, wherein rotation of the first set of one or more threaded fasteners causes pivoting movement occurring by torsion at the one or more flexures, thereby providing an elevation adjustment of the aiming laser portion in relation to the reticle mounting portion, and, wherein rotation of the second set of one or more threaded fasteners causes pivoting movement occurring by flexion at the flexures, thereby providing a windage adjustment of the aiming laser portion in relation to the reticle mounting portion.

An optical bench wherein the aiming laser portion includes at least one laser receptacle for receiving a laser emitter and at least one lens receptacle for supporting a laser lens assembly in an optical path of the laser emitter.

An optical bench wherein the at least one lens receptacle has a internally threaded surface configured to engage complementary external threads on the laser lens assembly, and further wherein the at least one lens receptacle has a gap defining resiliently flexible and outwardly expandable curved flexure elements.

An optical bench further comprising an optical bench mounting portion attached to the aiming laser portion, the optical bench mounting portion configured to fasten the optical bench within a housing of the weapon mounted sight assembly.

An optical bench further comprising a bore sight lever attached to the optical bench mounting portion, the bore sight lever having a horizontal bearing surface that is movable to provide an elevation bore sight adjustment and a vertical bearing surface that is movable to provide a windage bore sight adjustment.

An optical bench wherein the optical bench mounting portion includes a first bore sight flexure configured to flex responsive to movement of the bore sight lever in a first direction and a second bore sight flexure configured to flex responsive to movement of the bore sight lever in a second direction orthogonal to the first direction.

A weapon sight assembly comprising an optical bench supported in a housing, the optical bench including a reflex sight mounting portion having a first surface for receiving a reticle light source; and a first reticle lens mounting arm spaced apart from a second reticle lens mounting arm, the first and second reticle lens mounting arms attached to the reflex sight mounting portion, and the first and second reticle lens mounting arms configured to engage opposite sides of a reticle lens to support the reticle lens in an optical path of the reticle light source, the first and second reticle lens mounting arms being sufficiently resilient to accommodate thermal expansion and contraction of the reticle lens, a reticle light source received within the housing and attached to the first surface, and a reticle lens attached to the first and second reticle mounting arms.

A weapon sight assembly wherein the reticle lens is formed of a plastic material.

A weapon sight assembly wherein the optical bench further includes an aiming laser portion and one or more aiming laser flexures connecting the aiming laser portion to the reflex sight mounting portion, wherein the aiming laser portion is pivotable about the one or more aiming laser flexures for adjusting an angular orientation of the aiming laser portion in relation to the reflex sight mounting portion, the aiming laser portion including at least one laser receptacle receiving a laser emitter and at least one lens receptacle supporting a laser lens assembly in an optical path of the laser emitter.

A weapon sight assembly wherein the optical bench further includes an optical bench mounting portion attached to the aiming laser portion, the optical bench mounting portion securing the optical bench within the housing.

A weapon sight assembly further comprising a bore sight lever attached to the optical bench mounting portion, the bore sight lever having a horizontal bearing surface that is movable to provide an elevation bore sight adjustment and a vertical bearing surface that is movable to provide a windage bore sight adjustment, an elevation adjustment assembly disposed within the housing and bearing against the horizontal bearing surface, and a windage adjustment assembly disposed within the housing and bearing against the vertical bearing surface.

A method of manufacturing an optical bench for a weapon mounted sight assembly comprising additively manufacturing a reflex sight assembly mounting portion and additively manufacturing a pair of opposing reflex lens mounting arms, wherein the pair of opposing reflex lens mounting arms are resilient and flexible and have multiple degrees of movement.

A method further comprising additively manufacturing an aiming laser portion and one or more aiming laser flexures connecting the aiming laser portion to the reflex sight mounting portion, wherein the aiming laser portion is pivotable about the one or more aiming laser flexures for adjusting an angular orientation of the aiming laser portion in relation to the reflex sight mounting portion, the aiming laser portion including at least one laser receptacle for receiving a laser emitter and at least one lens receptacle for supporting a laser lens assembly in an optical path of the laser emitter.

A method further comprising, optionally, additively manufacturing an optical bench mounting portion, additively manufacturing a windage and elevation adjustment lever extending from the aiming laser portion, and additively manufacturing a pivot flexure between the optical bench mounting portion and the windage and elevation adjustment lever.

A weapon sight assembly comprising an optical bench, the optical bench being a single-piece structure having no bonded or bolted joints, a reflex sight portion disposed on the optical bench, wherein the reflex sight portion includes a reticle receiving portion, and a lens assembly disposed on the optical bench, wherein the lens assembly includes a reflex lens.

A weapon sight assembly wherein the optical bench comprises one or more reflex lens mounting arms, wherein each of the one or more reflex lens mounting arms are configured to retain the reflex lens.

A weapon sight assembly wherein the reticle sight portion comprises a light source and a reticle frame, and wherein the reticle light source assembly is configured to be received by the reticle receiving portion.

A weapon sight assembly wherein the reflex lens is configured to function as a partially reflective mirror.

A weapon sight assembly further comprising one or more threaded adjustment screws for adjusting one or more of elevation and windage of the reflex sight portion.

A weapon sight assembly further comprising a rear sight mounting portion and an iron sight system comprising a front sight embedded in the reflex lens, and a rear sight, wherein the rear sight is attached to the rear sight mounting portion.

A weapon sight assembly wherein each of the one or more reflex lens mounting arms comprises a horizontal arm portion and two upstanding arm portions, wherein the two upstanding arm portions are configured to claim a side portion of the reflex lens.

A weapon sight wherein the optical bench is formed via an additive manufacturing process.

A weapon sight assembly comprising an optical bench, the optical bench being a single-piece structure having no bonded or bolted joints, a laser receptacle portion disposed on the optical bench, the laser receptacle portion comprising one or more receptacles and one or more aiming laser assemblies, and a bore sight adjustment lever disposed on the optical bench, the bore sight adjustment lever extending from the laser receptacle portion.

A weapon sight assembly wherein the one or more receptacles is configured to support one or more laser emitter.

A weapon sight assembly wherein the one or more laser emitters includes one or more of: a visible target point laser, a visible target aiming laser, an infrared target pointing laser, an infrared target aiming laser, an infrared illuminator laser, and an infrared flood light laser.

A weapon sight assembly wherein each of the one or more receptacles is configured to substantially align with one or more laser diode receptacles.

A weapon sight assembly wherein each of the one or more aiming laser assemblies comprises a laser emitter and laser lens assembly.

A weapon sight assembly wherein each of the one or more lens assemblies comprises a laser focusing lens and a lens holder, wherein the lens holder comprises a laser focusing lens and a lens holder.

A weapon sight assembly wherein the optical bench comprises one or more flexures for directional adjustment of the one or more aiming laser assemblies, a platform portion disposed on the optical bench, wherein the platform portion has one or more threaded openings, and one or more threaded screws, wherein the one or more threaded screws are configured to rotatably engage with the one or more threaded openings.

A weapon sight assembly wherein the optical bench further comprises a bench surface, wherein the one or more threaded screws are configured to rotatably engage with the bench surface to adjust the orientation of the bench surface with respect to the platform portion.

A weapon sight assembly wherein the bore sight adjustment lever comprises a windage adjustment bearing surface disposed on the bore sight adjustment lever, the windage adjustment bearing surface configured to engage with a windage adjustment assembly, a windage counter spring bearing surface disposed on the bore sight adjustment lever, the windage counter spring bearing surface configured to engage with a windage adjustment counter spring, an elevation adjustment bearing surface disposed on the bore sight adjustment lever, the elevation adjustment bearing surface configured to engage with an elevation adjustment assembly, and an elevation counter spring bearing surface disposed on the bore sight adjustment lever, the elevation counter spring bearing surface configured to engage with an elevation counter spring.

A weapon sight assembly wherein the windage adjustment assembly is comprised of a first sleeve having an internal helical thread, a rotatable barrel having an external helical thread complimentary to the internal helical thread, and a bearing member.

A weapon sight assembly wherein the elevation adjustment assembly is comprised of a sleeve having an internal helical thread, a rotatable barrel having an external helical thread complimentary to the internal helical thread, and a bearing member.

A weapon sight assembly comprising an optical bench, the optical bench being a single-piece structure having no bonded or bolted joints, a reflex sight portion disposed on the optical bench, wherein the reflex sight portion includes a reticle receiving portion, a lens assembly disposed on the optical bench, wherein the lens assembly includes a reflex lens, a laser receptacle portion disposed on the optical bench, the laser receptacle portion comprising one or more receptacles and one or more aiming laser assemblies, a bore sight adjustment lever disposed on the optical bench, the bore sight adjustment lever extending from the laser receptacle portion, and a mounting member, wherein the mounting member is connected to the optical bench by one or more flexures.

The invention has been described with reference to the preferred embodiment. Modifications and alterations will occur to others upon a reading and understanding of the preceding detailed description. It is intended that the invention be construed as including all such modifications and alterations insofar as they come within the scope of the appended claims and their equivalents.

What is claimed is:

1. An optical bench for supporting a reflex sight in a weapon-mounted sight assembly, the optical bench comprising:
   a reflex sight mounting portion having a first surface for receiving a reticle light source; and
   a first reticle lens mounting arm spaced apart from a second reticle lens mounting arm, the first and second reticle lens mounting arms attached to the reflex sight mounting portion, and the first and second reticle lens mounting arms configured to engage opposite sides of a reticle lens to support the reticle lens in an optical path of the reticle light source, the first and second reticle lens mounting arms being sufficiently resilient to accommodate thermal expansion and contraction of the reticle lens, wherein the first and second reticle lens mounting arms are resilient with multiple degrees of movement.

2. The optical bench of claim 1, wherein the reflex sight mounting portion is formed with the first and second reticle lens mounting arms as a monolithic structure.

3. The optical bench of claim 2, wherein the monolithic structure is defined as a series of additive manufactured layers built upon each other.

4. The optical bench of claim 1, wherein each of the first and second reticle lens mounting arms have a horizontal segment attached to reflex sight mounting portion and a vertical segment disposed at a distal end of the horizontal segment.

5. The optical bench of claim 4, wherein:
   said horizontal segment is configured for both flexion movement and torsion movement responsive to thermal expansion and contraction of the reticle lens; and
   each vertical segment comprises a pair of upstanding arms defining a clip configured to engage a complementary protrusion on the reticle lens, wherein the pair of upstanding arms are configured for flexion movement responsive to thermal expansion of the reticle lens.

6. The optical bench of claim 1, further comprising one or both of:
   a reticle frame removably attached to the first surface, the reticle frame configured to carry the reticle light source; and
   a rear iron sight removably attached to the first surface.

7. The optical bench of claim 1, wherein at least a portion of the optical bench is manufactured using an additive manufacturing process.

8. An optical bench of for supporting a reflex sight in a weapon-mounted sight assembly, the optical bench comprising:
   a reflex sight mounting portion having a first surface for receiving a reticle light source;
   a first reticle lens mounting arm spaced apart from a second reticle lens mounting arm, the first and second reticle lens mounting arms attached to the reflex sight mounting portion, and the first and second reticle lens mounting arms configured to engage opposite sides of a reticle lens to support the reticle lens in an optical path of the reticle light source, the first and second reticle lens mounting arms being sufficiently resilient to accommodate thermal expansion and contraction of the reticle lens, and
   an aiming laser portion and one or more aiming laser flexures connecting the aiming laser portion to the reflex sight mounting portion, wherein the aiming laser portion is pivotable about said one or more aiming laser flexures for adjusting an angular orientation of the aiming laser portion in relation to the reflex sight mounting portion.

9. The optical bench of claim 8, wherein the aiming laser portion is configured to pivot responsive to torsion, flexion, or both at said one or more flexures.

10. The optical bench of claim 8, wherein each of said one or more flexures extends transversely with respect to an optical axis of the optical bench and each of said one or more flexures has a long axis and a short axis, the optical bench further comprising:
    a horizontal bench surface spaced apart from the reticle mounting portion;
    a first set of one or more threaded fasteners which are rotatable to move the reticle mounting portion in relation to the horizontal bench surface;
    a bench side surface attached to the reticle mounting portion;
    a vertical bench surface spaced apart from the bench side surface;
    a second set of one or more threaded fasteners which are rotatable to move the bench side surface in relation to the vertical bench surface;
    wherein rotation of the first set of one or more threaded fasteners causes pivoting movement occurring by torsion at said one or more flexures, thereby providing an elevation adjustment of the aiming laser portion in relation to the reticle mounting portion; and
    wherein rotation of the second set of one or more threaded fasteners causes pivoting movement occurring by flexion at said flexures, thereby providing a windage adjustment of the aiming laser portion in relation to the reticle mounting portion.

11. The optical bench of claim 8, wherein said aiming laser portion includes at least one laser receptacle for receiving a laser emitter and at least one lens receptacle for supporting a laser lens assembly in an optical path of the laser emitter.

12. The optical bench of claim 11, wherein the at least one lens receptacle has a internally threaded surface configured to engage complementary external threads on the laser lens assembly, and further wherein the at least one lens receptacle has a gap defining resiliently flexible and outwardly expandable curved flexure elements.

13. The optical bench of claim 12, further comprising an optical bench mounting portion attached to the aiming laser portion, the optical bench mounting portion configured to fasten the optical bench within a housing of the weapon mounted sight assembly.

14. The optical bench of claim 13, further comprising a bore sight lever attached to the optical bench mounting portion, the bore sight lever having a horizontal bearing surface that is movable to provide an elevation bore sight adjustment and a vertical bearing surface that is movable to provide a windage bore sight adjustment.

15. The optical bench of claim 14, wherein the optical bench mounting portion includes a first bore sight flexure configured to flex responsive to movement of said bore sight lever in a first direction and a second bore sight flexure configured to flex responsive to movement of said bore sight lever in a second direction orthogonal to said first direction.

16. The optical bench of claim 8, wherein the first and second reticle lens mounting arms are resilient with multiple degrees of movement.

17. A weapon sight assembly, comprising:
    an optical bench supported in a housing, the optical bench including a reflex sight mounting portion having a first surface for receiving a reticle light source; and a first reticle lens mounting arm spaced apart from a second reticle lens mounting arm, the first and second reticle lens mounting arms attached to the reflex sight mounting portion, and the first and second reticle lens mounting arms configured to engage opposite sides of a reticle lens to support the reticle lens in an optical path of the reticle light source, the first and second reticle lens mounting arms being sufficiently resilient to accommodate thermal expansion and contraction of the reticle lens, wherein the first and second reticle lens mounting arms are resilient with multiple degrees of movement;

the reticle light source received within the housing and attached to the first surface; and the reticle lens attached to the first and second reticle mounting arms.

18. The weapon sight assembly of claim 17, wherein the reticle lens is formed of a plastic material.

19. A weapon sight assembly, comprising:

an optical bench supported in a housing, the optical bench including a reflex sight mounting portion having a first surface for receiving a reticle light source; and a first reticle lens mounting arm spaced apart from a second reticle lens mounting arm, the first and second reticle lens mounting arms attached to the reflex sight mounting portion, and the first and second reticle lens mounting arms configured to engage opposite sides of a reticle lens to support the reticle lens in an optical path of the reticle light source, the first and second reticle lens mounting arms being sufficiently resilient to accommodate thermal expansion and contraction of the reticle lens;

said optical bench further including an aiming laser portion and one or more aiming laser flexures connecting the aiming laser portion to the reflex sight mounting portion, wherein the aiming laser portion is pivotable about said one or more aiming laser flexures for adjusting an angular orientation of the aiming laser portion in relation to the reflex sight mounting portion, said aiming laser portion including at least one laser receptacle receiving a laser emitter and at least one lens receptacle supporting a laser lens assembly in an optical path of the laser emitter;

the reticle light source received within the housing and attached to the first surface; and the reticle lens attached to the first and second reticle mounting arms.

20. The weapon sight assembly of claim 19, wherein the optical bench further includes an optical bench mounting portion attached to the aiming laser portion, the optical bench mounting portion securing the optical bench within the housing.

21. The weapon sight assembly of claim 20, further comprising:

a bore sight lever attached to the optical bench mounting portion, the bore sight lever having a horizontal bearing surface that is movable to provide an elevation bore sight adjustment and a vertical bearing surface that is movable to provide a windage bore sight adjustment;

an elevation adjustment assembly disposed within the housing and bearing against the horizontal bearing surface; and a windage adjustment assembly disposed within the housing and bearing against the vertical bearing surface.

22. The weapon sight assembly of claim 19, wherein the first and second reticle lens mounting arms are resilient with multiple degrees of movement.

\* \* \* \* \*